United States Patent
Lee et al.

(10) Patent No.: US 9,374,813 B2
(45) Date of Patent: Jun. 21, 2016

(54) METHOD FOR ALLOCATING RESOURCES FOR DOWNLINK CONTROL CHANNEL IN WIRELESS COMMUNICATION SYSTEM AND DEVICE FOR SAME

(71) Applicant: LG Electronics Inc., Seoul (KR)

(72) Inventors: Seungmin Lee, Anyang-si (KR);
Hakseong Kim, Anyang-si (KR);
Hanbyul Seo, Anyang-si (KR);
Myoungseob Kim, Anyang-si (KR);
Inkwon Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 15 days.

(21) Appl. No.: 14/385,978

(22) PCT Filed: Mar. 28, 2013

(86) PCT No.: PCT/KR2013/002577
§ 371 (c)(1),
(2) Date: Sep. 17, 2014

(87) PCT Pub. No.: WO2013/147523
PCT Pub. Date: Oct. 3, 2013

(65) Prior Publication Data
US 2015/0036616 A1 Feb. 5, 2015

Related U.S. Application Data

(60) Provisional application No. 61/617,042, filed on Mar. 28, 2012, provisional application No. 61/618,838, filed on Apr. 1, 2012, provisional application No. 61/620,975, filed on Apr. 5, 2012, provisionalapplication No. 61/635,862, filed on Apr. 19, 2012, provisional application No. 61/648,586, filed on May 17, 2012, provisional application No. 61/649,890, filed on May 21, 2012, provisional (Continued)

(51) Int. Cl.
*H04W 72/04* (2009.01)
*H04L 5/00* (2006.01)

(52) U.S. Cl.
CPC ........... *H04W 72/042* (2013.01); *H04L 5/0023* (2013.01); *H04L 5/0053* (2013.01)

(58) Field of Classification Search
None
See application file for complete search history.

(56) References Cited

U.S. PATENT DOCUMENTS

2012/0114021 A1* 5/2012 Chung .................. H04B 7/155
375/211
2013/0044685 A1* 2/2013 Fong .................... H04J 11/0053
370/328

(Continued)

FOREIGN PATENT DOCUMENTS

KR 10-2009-0126203 A 12/2009
KR 10-2010-0106504 A 10/2010

(Continued)

OTHER PUBLICATIONS

Motorola Mobility, EPDCCH Design Aspects:, R1-121583, GPP TSG RAN WG1 Meeting #68bis, Mar. 26-30, 2012.

*Primary Examiner* — Mohammad Adhami
(74) *Attorney, Agent, or Firm* — Dentons US LLP

(57) ABSTRACT

A method for allocating resources for a downlink control channel by a base station in a wireless communication system is disclosed. Specifically, the method comprises the steps of: mapping resource elements to resource element groups for each of resource blocks; forming control channel elements by using a predetermined number of resource element groups from among the resource element groups; and allocating control channel elements of a number corresponding to an aggregation level of the downlink control channel as resources for the downlink control channel, wherein the number of available resource elements included in each of the resource element groups or the number of available resource elements included in each of the control channel elements of a number corresponding to the aggregation level is uniform.

11 Claims, 33 Drawing Sheets

Related U.S. Application Data application No. 61/662,353, filed on Jun. 20, 2012, provisional application No. 61/721,484, filed on Nov. 1, 2012, provisional application No. 61/770,316, filed on Feb. 27, 2013.

(56) References Cited

U.S. PATENT DOCUMENTS

2013/0215842 A1* 8/2013 Han .................... H04W 72/042
370/329

2014/0071934 A1* 3/2014 Frenne .................... H04L 5/001
370/330
2014/0126487 A1* 5/2014 Chen ...................... H04B 15/00
370/329

FOREIGN PATENT DOCUMENTS

| | | | |
|---|---|---|---|
| KR | 10-2011-0121549 A | | 11/2011 |
| KR | 10-2012-0004543 A | | 1/2012 |
| WO | WO2011008013 | * | 7/2010 |

* cited by examiner

FIG. 2
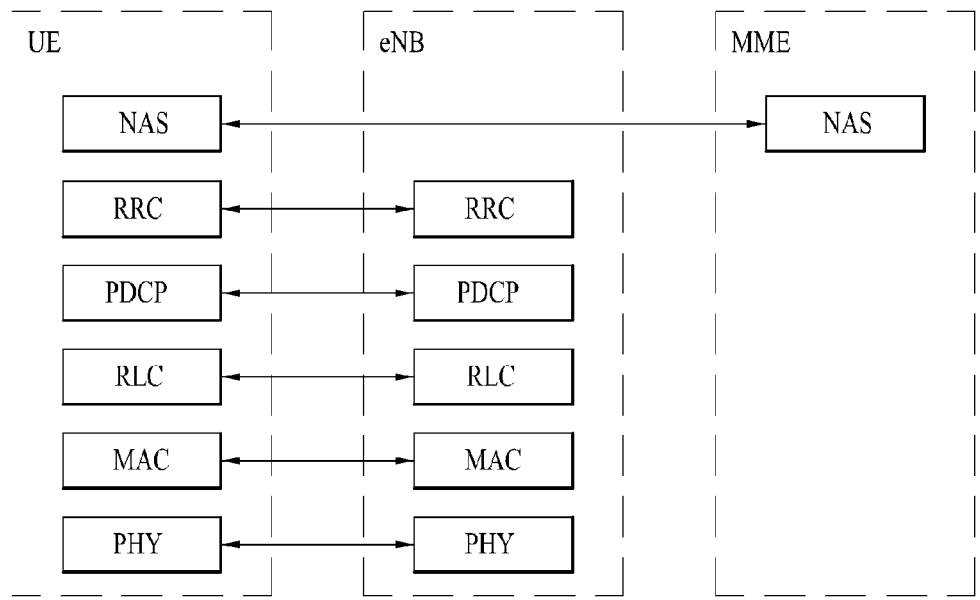
(a) CONTROL-PLANE PROTOCOL STACK
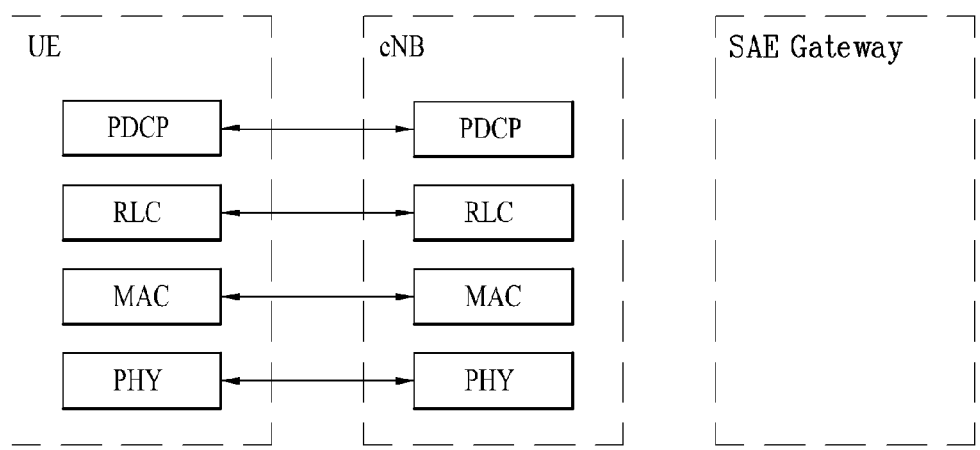
(b) USER-PLANE PROTOCOL STACK

FIG. 5
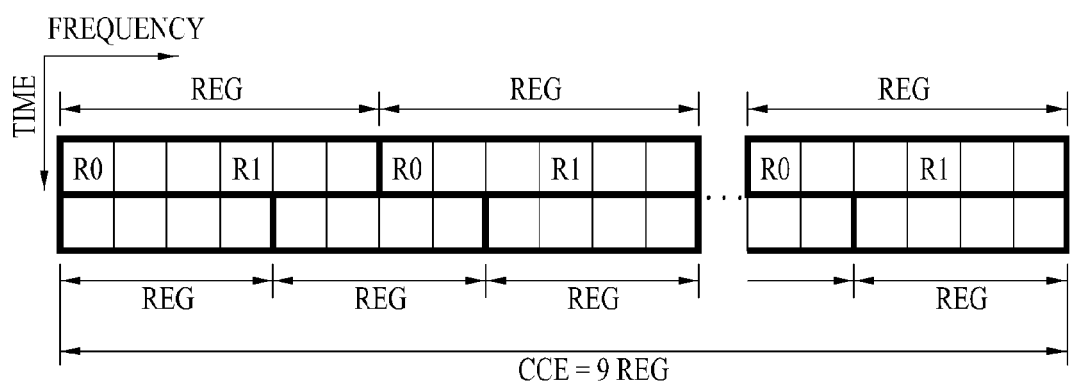
(a) 1TX OR 2TX
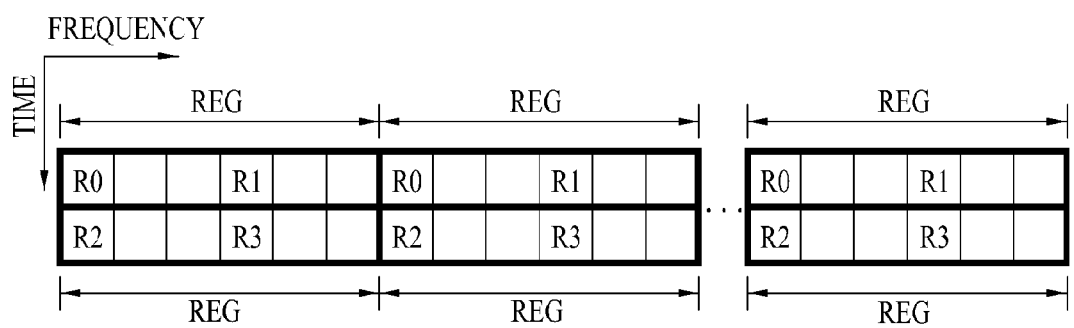
(b) 4 TX

▨ : DMRS GROUP 1

▩ : DMRS GROUP 2

FIG. 14
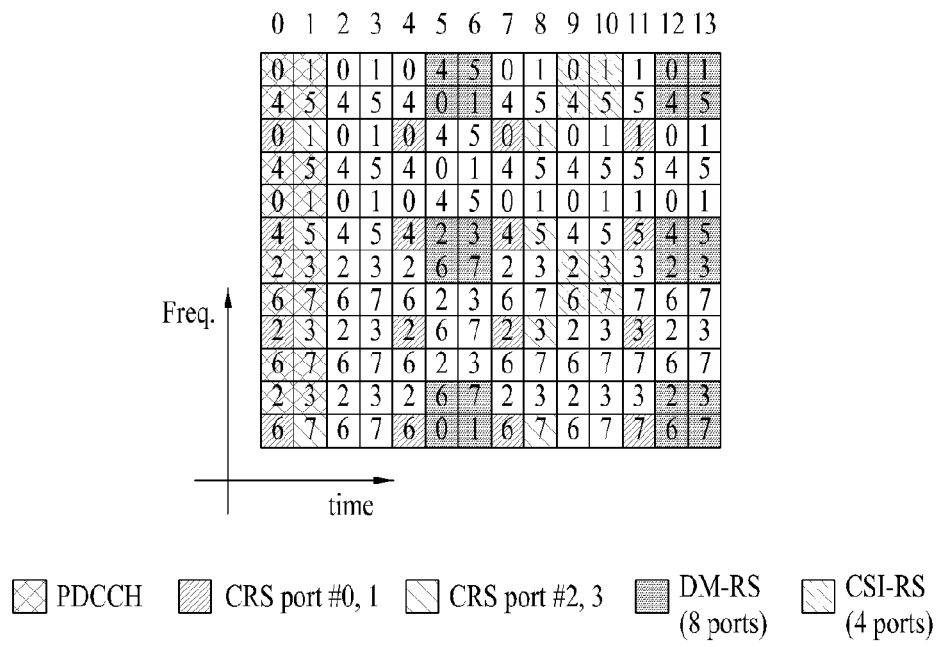
(a)
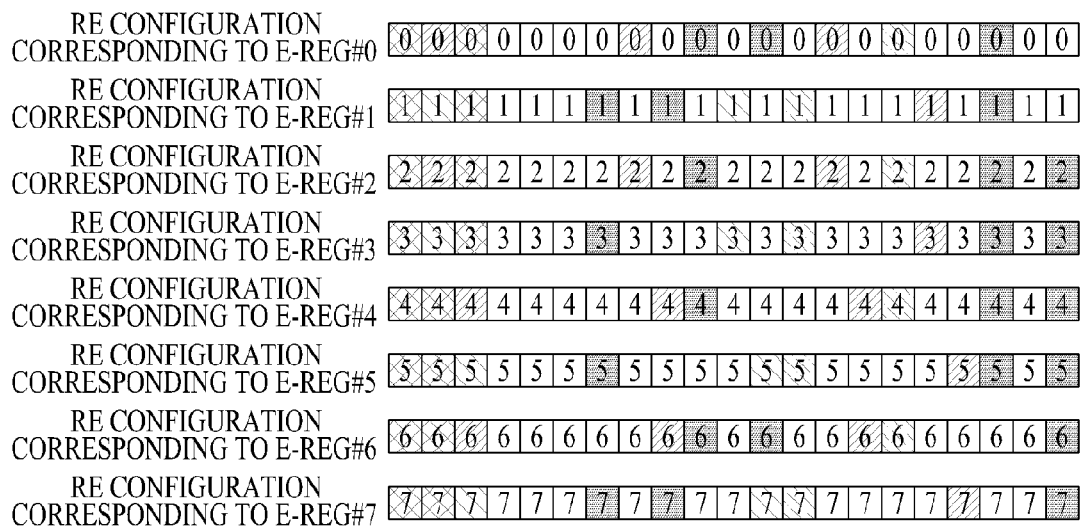
(b)

FIG. 15
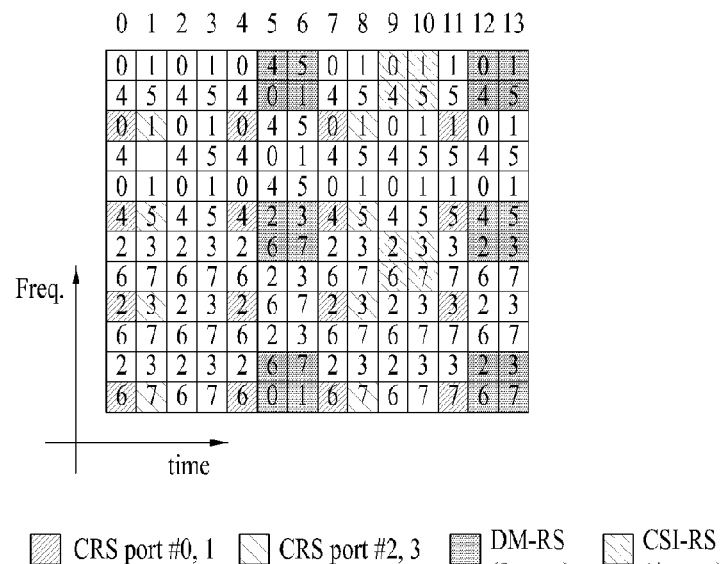
(a)
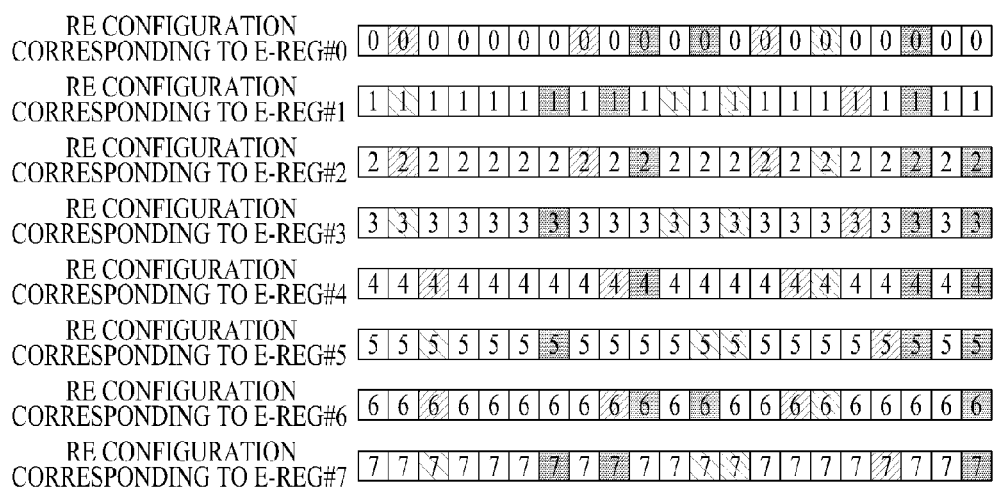
(b)

FIG. 27
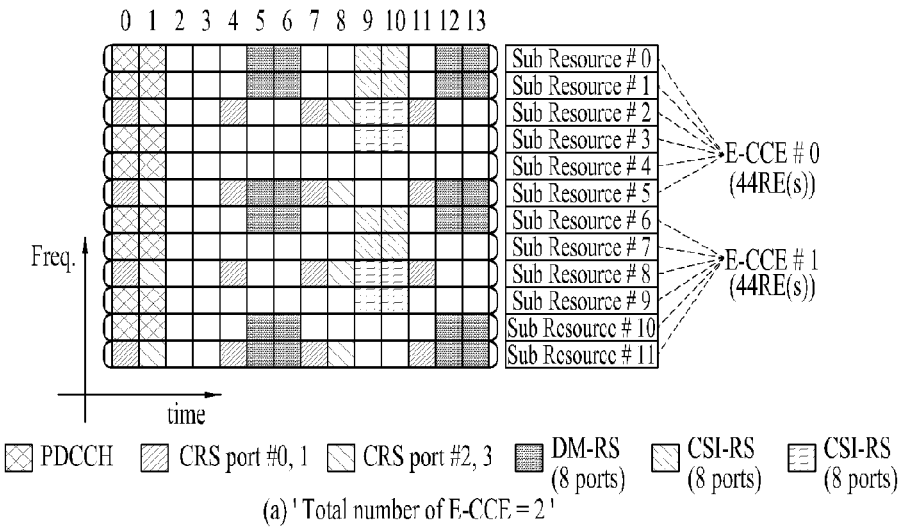
(a) 'Total number of E-CCE = 2'
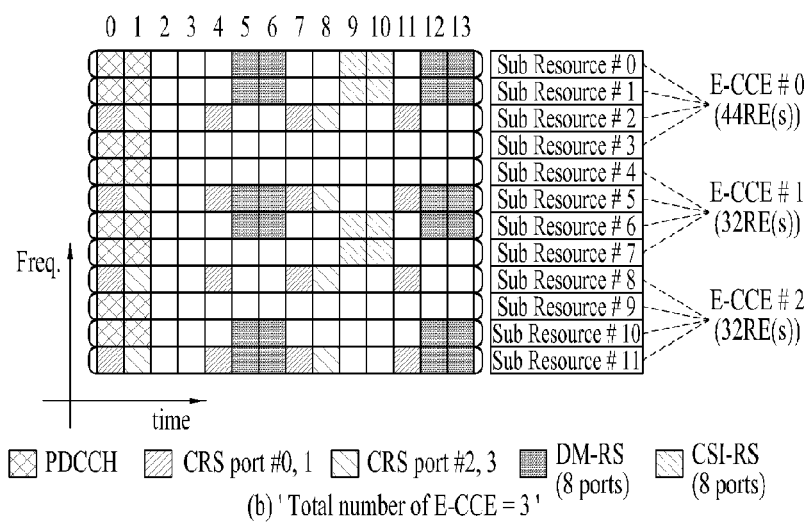
(b) 'Total number of E-CCE = 3'
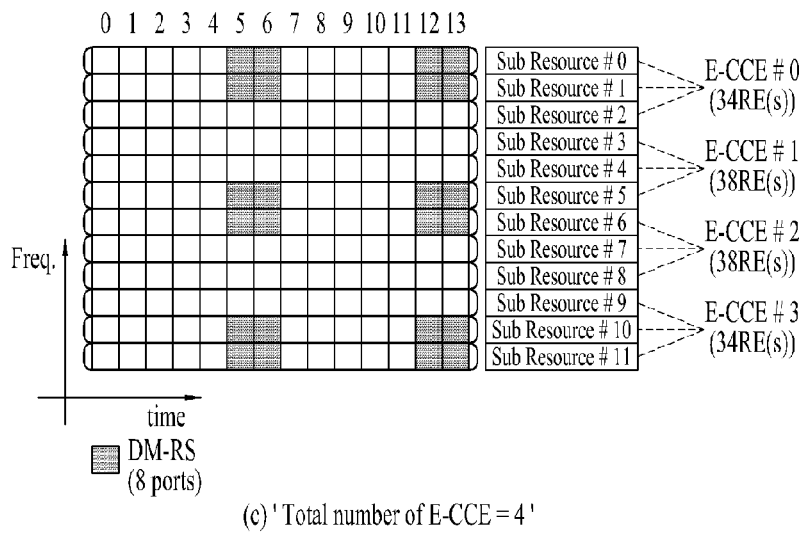
(c) 'Total number of E-CCE = 4'

☒ DM-RS (Port #7, #8)   ☒ DM-RS (Port #9, #10)

FIG. 41
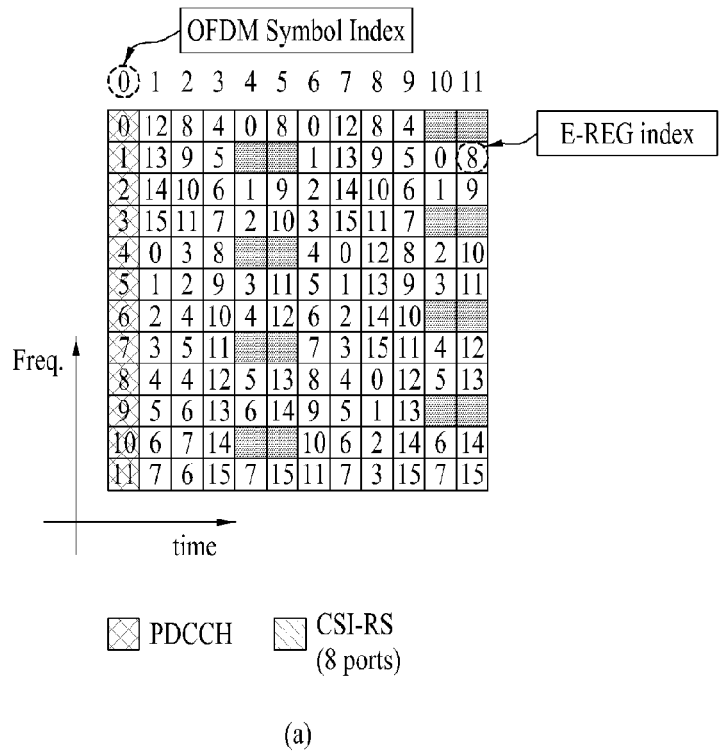
(a)
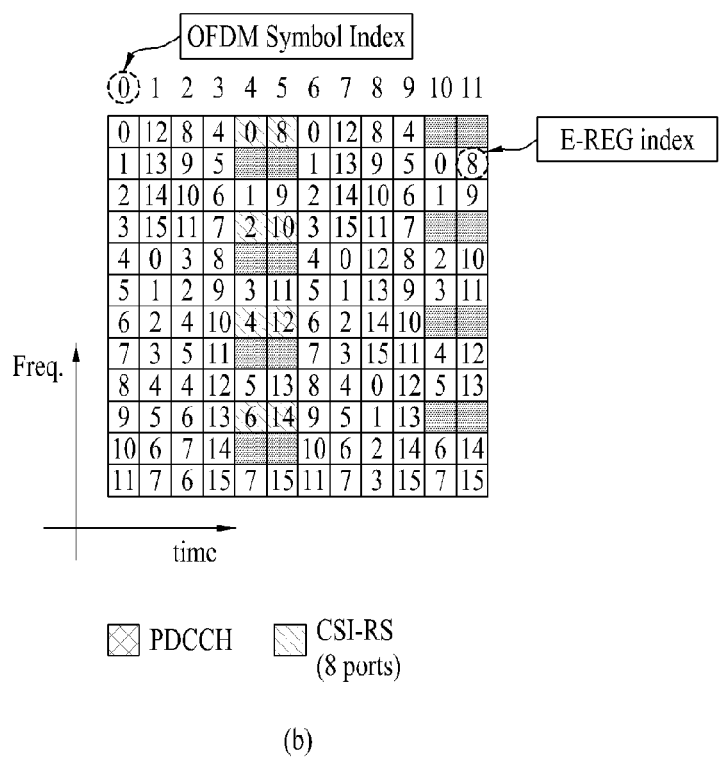
(b)

FIG. 42
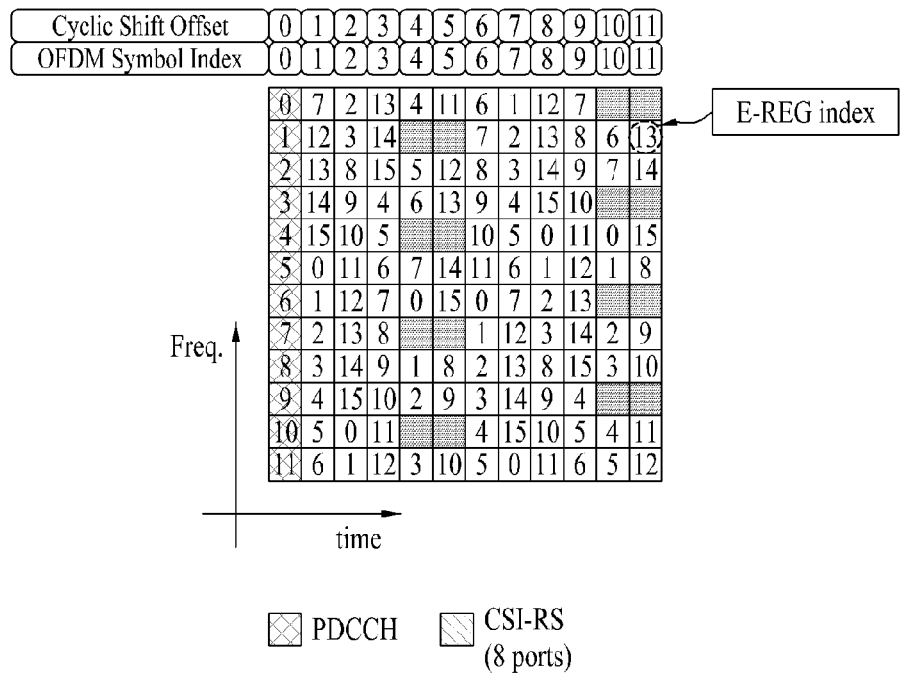
(a)
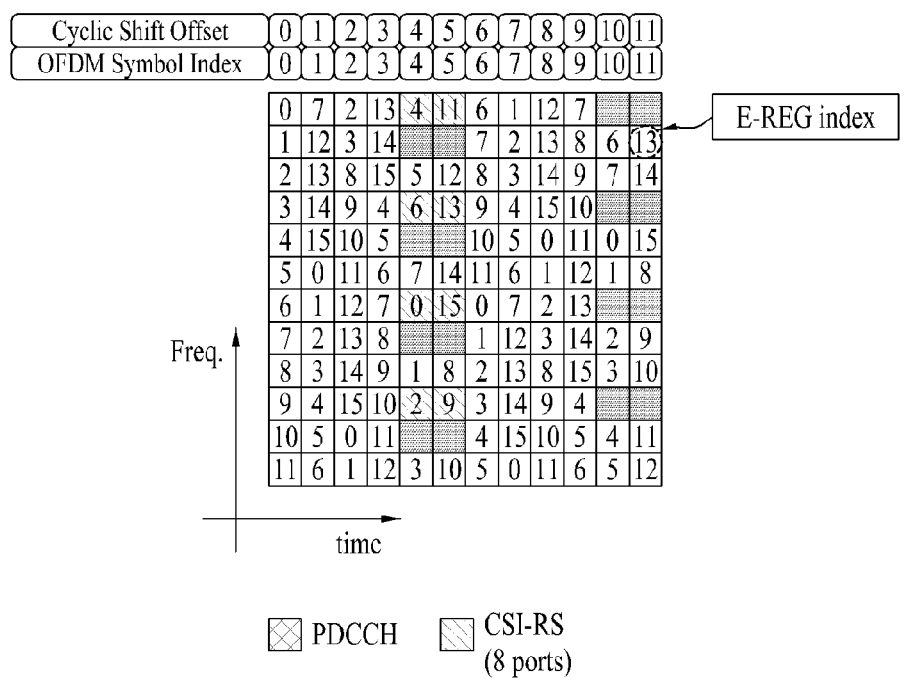
(b)

METHOD FOR ALLOCATING RESOURCES FOR DOWNLINK CONTROL CHANNEL IN WIRELESS COMMUNICATION SYSTEM AND DEVICE FOR SAME

This Application is a 35 U.S.C. §371 National Stage entry of International Application No. PCT/KR 2013/002577, filed Mar. 28, 2013, which claims benefit of Provisional Application Nos. 61/617,042 filed Mar. 28, 2012; 61/618,838 filed Apr. 1, 2012; 61/620,975 filed Apr. 5, 2012; 61/635,862 filed Apr. 19, 2012; 61/648,586 filed May 17, 2012; 61/649,890 filed May 21, 2012; 62/662,353 filed Jun. 20, 2012; 61/721,484 filed Nov. 1, 2012; and 61/770,316 filed Feb. 27, 2013, all of which are incorporated by reference in their entirety herein.

TECHNICAL FIELD

The present invention relates to a wireless communication system, and more particularly, to a method for allocating resources for a downlink control channel in a wireless communication system and a device for the same.

BACKGROUND ART

As an example of a wireless communication system to which the present invention is applicable, a $3^{rd}$ generation partnership project (3GPP) long term evolution (LTE) communication system will be schematically described.

FIG. 1 is a diagram showing a network structure of an evolved universal mobile telecommunications system (E-UMTS) as a mobile communication system. The E-UMTS is an evolved form of the UMTS and has been standardized in the 3GPP. Generally, the E-UMTS may be called a long term evolution (LTE) system. For details of the technical specifications of the UMTS and E-UMTS, refer to Release 7 and Release 8 of "$3^{rd}$ generation partnership project; technical specification group radio access network".

Referring to FIG. 1, the E-UMTS mainly includes a user equipment (UE), base stations (or eNBs or eNode Bs), and an Access Gateway (AG) which is located at an end of a network (E-UTRAN) and which is connected to an external network. Generally, an eNB can simultaneously transmit multiple data streams for a broadcast service, a multicast service and/or a unicast service.

One or more cells may exist per eNB. The cell is set to use a bandwidth such as 1.44, 3, 5, 10, 15 or 20 MHz to provide a downlink or uplink transmission service to several UEs. Different cells may be set to provide different bandwidths. The eNB controls data transmission or reception of a plurality of UEs. The eNB transmits downlink (DL) scheduling information of DL data so as to inform a corresponding UE of time/frequency domain in which data is transmitted, coding, data size, and hybrid automatic repeat and request (HARQ)-related information. In addition, the eNB transmits uplink (UL) scheduling information of UL data to a corresponding UE so as to inform the UE of a time/frequency domain which may be used by the UE, coding, data size and HARQ-related information. An interface for transmitting user traffic or control traffic can be used between eNBs. A Core Network (CN) may include the AG and a network node or the like for user registration of the UE. The AG manages mobility of a UE on a Tracking Area (TA) basis. One TA includes a plurality of cells.

Although wireless communication technology has been developed up to long term evolution (LTE) based on wideband code division multiple access (WCDMA), the demands and the expectations of users and providers continue to increase. In addition, since other radio access technologies have been continuously developed, new technology evolution is required to secure high competitiveness in the future. Decrease in cost per bit, increase in service availability, flexible use of a frequency band, simple structure, open interface, suitable User Equipment (UE) power consumption and the like are required.

DISCLOSURE

Technical Problem

An object of the present invention devised to solve the problem lies in a method for allocating resources for a downlink control channel in a wireless communication system and a device for the same.

Technical Solution

The object of the present invention can be achieved by providing a method for allocating a resource for a downlink control channel by a base station (BS) in a wireless communication system, the method including performing mapping resource elements and resource element groups to each of resource blocks, configuring control channel elements using a predetermined number of resource element groups among the resource element groups, and allocating control channel elements, the number of which corresponds to an aggregation level of the downlink control channel, as a resource for the downlink control channel, wherein the number of available resource elements included in each of the resource element groups or the number of available resource elements included in each of the control channel elements, the number of which corresponds to the aggregation level, is equivalent.

The number of resource elements for a reference signal included in each of the resource element groups may be changed according to a type of a subframe in which the downlink control channel is transmitted.

The control channel elements, the number of which corresponds to the aggregation level, may be included in different resource blocks. In addition, the predetermined number may be determined according to a type of a subframe in which the downlink control channel is transmitted.

The performing may include performing specific resource element group indexing on resource elements of a symbol in which a reference signal is configured, and performing the specific resource element group indexing using a predetermined offset on resource elements of a symbol in which a reference signal is not configured. The predetermined offset may be increased or reduced in a unit of a specific value as a symbol index is increased. In addition, the specific resource element group indexing may be changed based on a resource block index.

The method may further include puncturing a resource element for a reference signal for the downlink control channel. In addition, the method may further include rate-matching the downlink control channel so as to correspond to resources for the downlink control channel, obtained by excluding a resource element for a reference signal.

Advantageous Effects

According to an embodiment of the present invention, resources for a downlink control channel can be effectively allocated.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

FIG. 2 shows a control plane and a user plane of a radio interface protocol between a UE and an evolved universal terrestrial radio access network (E-UTRAN) based on a 3GPP radio access network standard.

FIG. 5 illustrates resource units used to configure a control channel.

FIG. 14 illustrates an example in which an E-REG included in an E-PDCCH is formed in one PRB pair according to an embodiment of the present invention.

FIG. 15 illustrates another example in which an E-REG included in an E-PDCCH is formed in one PRB pair according to a first embodiment of the present invention.

FIG. 27 illustrates an example of configuration of sub-resources in one PRB pair region configured for E-PDCCH transmission according to a third embodiment of the present invention.

FIG. 41 illustrates an example of RE indexing of an E-REG in one PRB pair for explanation of the sixth embodiment of the present invention.

FIG. 42 illustrates another example of RE indexing of an E-REG in one PRB pair for explanation of the sixth embodiment of the present invention.

BEST MODE

Figure 1:
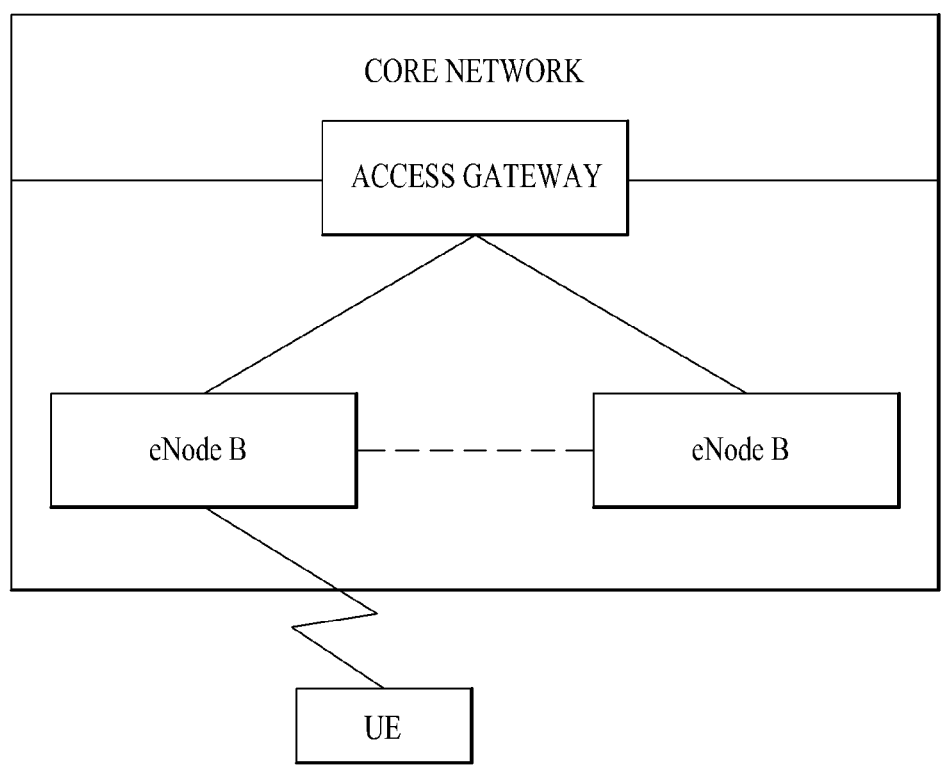
FIG. 1 is a diagram showing a network structure of an evolved universal mobile telecommunications system (E-UMTS) as a mobile communication system.

The configuration, operation and other features of the present invention will be understood by the embodiments of the present invention described with reference to the accompanying drawings. The following embodiments are examples of applying the technical features of the present invention to a 3rd Generation Partnership Project (3GPP) system.

Although, for convenience, the embodiments of the present invention are described using the LTE system and the LTE-A system in the present specification, the embodiments of the present invention are applicable to any communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

FIG. 2 shows a control plane and a user plane of a radio interface protocol between a UE and an evolved universal terrestrial radio access network (E-UTRAN) based on a 3GPP radio access network standard. The control plane refers to a path used for transmitting control messages used for managing a call between the UE and the network. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on a higher layer via a transport channel. Data is transported between the MAC layer and the PHY layer via the transport channel. Data is also transported between a physical layer of a transmitting side and a physical layer of a receiving side via a physical channel. The physical channel uses a time and a frequency as radio resources. More specifically, the physical channel is modulated using an orthogonal frequency division multiple access (OFDMA) scheme in downlink and is modulated using a single-carrier frequency division multiple access (SC-FDMA) scheme in uplink.

A medium access control (MAC) layer of a second layer provides a service to a radio link control (RLC) layer of a higher layer via a logical channel. The RLC layer of the second layer supports reliable data transmission. The function of the RLC layer may be implemented by a functional block within the MAC. A packet data convergence protocol (PDCP) layer of the second layer performs a header compression function to reduce unnecessary control information for efficient transmission of an Internet Protocol (IP) packet such as an IPv4 packet or an IPv6 packet in a radio interface having a relatively small bandwidth.

A radio resource control (RRC) layer located at the bottom of a third layer is defined only in the control plane and is responsible for control of logical, transport, and physical channels in association with configuration, re-configuration, and release of radio bearers (RBs). The RB is a service that the second layer provides for data communication between the UE and the network. To accomplish this, the RRC layer of the UE and the RRC layer of the network exchange RRC messages. If an RRC connection is established between the UE and the E-UTRAN, the UE is in RRC Connected mode and otherwise, the UE is in RRC idle mode. A non-access stratum (NAS) layer above the RRC layer performs functions including session management and mobility management.

One cell of the eNB is set to use a bandwidth such as 1.4, 3, 5, 10, 15, or 20 MHz to provide a downlink or uplink transmission service to several UEs. Different cells may be set to provide different bandwidths.

Downlink transport channels for transmission of data from the network to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through a downlink SCH and may also be transmitted through a downlink multicast channel (MCH). Uplink transport channels for transmission of data from the UE to the network include a random access channel (RACH) for transmission of initial control messages and an uplink SCH for transmission of user traffic or control messages. Logical channels, which are located above the transport channels and are mapped to the transport channels, include a broadcast control channel (BCCH), a paging control channel (PCCH), a common control channel (CCCH), a multicast control channel (MCCH), and a multicast traffic channel (MTCH).

Figure 3:
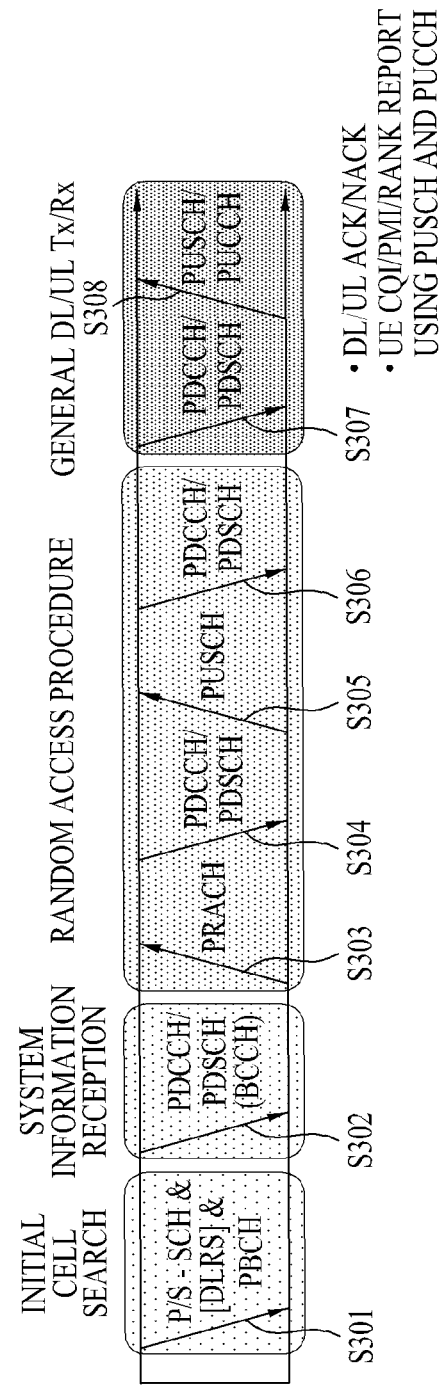
FIG. 3 is a diagram showing physical channels used in a 3GPP system and a general signal transmission method using the same.

FIG. 3 is a diagram showing physical channels used in a 3GPP system and a general signal transmission method using the same.

A UE performs an initial cell search operation such as synchronization with an eNB when power is turned on or the UE enters a new cell (S301). The UE may receive a primary synchronization channel (P-SCH) and a secondary synchronization channel (S-SCH) from the eNB, perform synchronization with the eNB, and acquire information such as a cell ID. Thereafter, the UE may receive a physical broadcast channel from the eNB so as to acquire broadcast information within the cell. Meanwhile, the UE may receive a downlink reference signal (DL RS) so as to confirm a downlink channel state in the initial cell search step.

The UE which completes the initial cell search may receive a physical downlink control channel (PDCCH) and a physical downlink shared channel (PDSCH) according to information included in the PDCCH so as to acquire more detailed system information (S302).

Meanwhile, if the eNB is initially accessed or radio resources for signal transmission are not present, the UE may perform a random access procedure (RACH) (step S303 to S306) with respect to the eNB. In this case, the UE may transmit a specific sequence through a physical random access channel (PRACH) as a preamble (S303 and S305), and receive a response message of the preamble through the PDCCH and the PDSCH corresponding thereto (S304 and S306). In the case of contention-based RACH, a contention resolution procedure may be further performed.

The UE which performs the above procedures may perform PDCCH/PDSCH reception (S307) and physical uplink shared channel (PUSCH)/physical uplink control channel (PUCCH) transmission (S308) as a general uplink/downlink signal transmission procedure. In particular, the UE receives downlink control information (DCI) via a PDCCH. The DCI includes control information such as resource allocation information of the UE and the format thereof is changed according to use purpose.

The control information transmitted from the UE to the eNB in uplink or transmitted from the eNB to the UE in downlink includes a downlink/uplink ACK/NACK signal, a channel quality indicator (CQI), a precoding matrix index (PMI), a rank indicator (RI), and the like. In the case of the 3GPP LTE system, the UE may transmit the control information such as CQI/PMI/RI through the PUSCH and/or the PUCCH.

Figure 4:
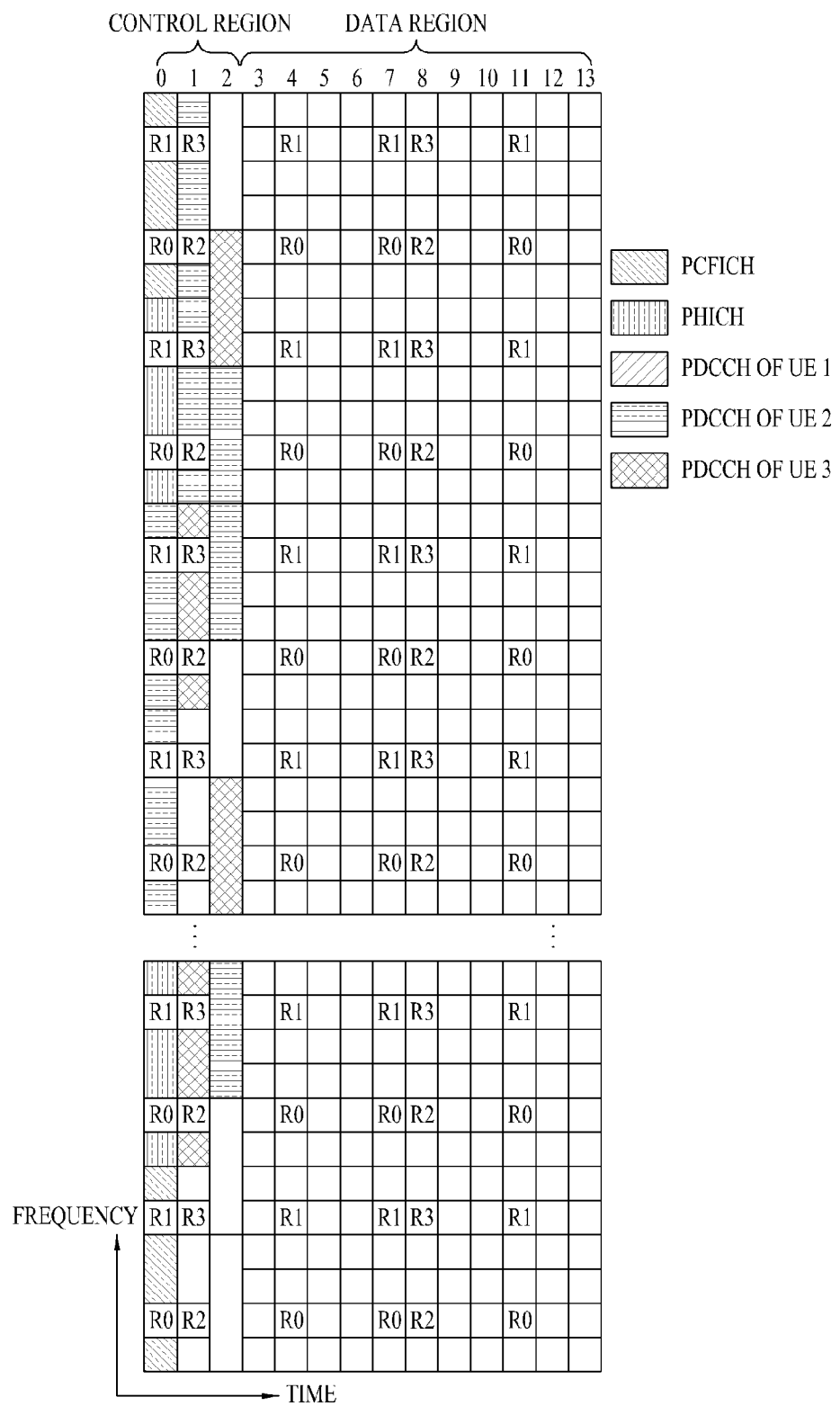
FIG. 4 illustrates an exemplary control channel included in the control region of a subframe in a downlink radio frame.

FIG. 4 illustrates an exemplary control channel included in the control region of a subframe in a downlink radio frame. Although the number of OFDM symbols included in one subframe may vary according to a length of a cyclic prefix (CP) (that is, whether the CP is a normal CP or an extended CP) and an interval between subcarriers, it will be assumed that the CP is a normal CP and the interval between subcarriers is 15 kHz.

Referring to FIG. 4, a subframe includes 14 OFDM symbols. The first one to three OFDM symbols of a subframe are used for a control region and the other 13 to 11 OFDM symbols are used for a data region according to a subframe configuration.

In FIG. 4, reference characters R1 to R4 denote RSs or pilot signals for antenna 0 to antenna 3. RSs are allocated in a predetermined pattern in a subframe irrespective of the control region and the data region. A control channel is allocated to non-RS resources in the control region and a traffic channel is also allocated to non-RS resources in the data region. Control channels allocated to the control region include a physical control format indicator channel (PCFICH), a physical hybrid-arq indicator channel (PHICH), a physical downlink control channel (PDCCH), etc.

The PCFICH is a physical control format indicator channel carrying information about the number of OFDM symbols used for PDCCHs in each subframe. The PCFICH is located in the first OFDM symbol of a subframe and configured with priority over the PHICH and the PDCCH. The PCFICH is composed of 4 resource element groups (REGs), each REG being distributed to the control region based on a cell identity (ID). One REG includes 4 resource elements (REs). An RE is a minimum physical resource defined by one subcarrier by one OFDM symbol. The PCFICH indicates 1 to 3 or 2 to 4 according to a bandwidth. The PCFICH is modulated in quadrature phase shift keying (QPSK).

The PHICH is a physical hybrid-automatic repeat and request (HARQ) indicator channel carrying an HARQ ACK/NACK for an uplink transmission. That is, the PHICH is a channel that delivers DL ACK/NACK information for UL HARQ. The PHICH includes one REG and is scrambled cell-specifically. An ACK/NACK is indicated in one bit and modulated in binary phase shift keying (BPSK). The modulated ACK/NACK is spread with a Spreading Factor (SF) of 2 or 4. A plurality of PHICHs mapped to the same resources form a PHICH group. The number of PHICHs multiplexed into a PHICH group is determined according to the number of spreading codes. A PHICH (group) is repeated three times to obtain a diversity gain in the frequency domain and/or the time domain.

The PDCCH is a physical downlink control channel allocated to the first n OFDM symbols of a subframe. Here, n is 1 or a larger integer indicated by the PCFICH. The PDCCH is composed of one or more CCEs. The PDCCH carries resource allocation information about transport channels, PCH and DL-SCH, an uplink scheduling grant, and HARQ information to each UE or UE group. The PCH and the DL-SCH are transmitted on a PDSCH. Therefore, an eNB and a UE transmit and receive data usually on the PDSCH, except for specific control information or specific service data.

Information indicating one or more UEs to receive PDSCH data and information indicating how the UEs are supposed to receive and decode the PDSCH data are delivered on a PDCCH. For example, on the assumption that the cyclic redundancy check (CRC) of a specific PDCCH is masked by radio network temporary identity (RNTI) "A" and information about data transmitted in radio resources (e.g. at a frequency position) "B" based on transport format information (e.g. a transport block size, a modulation scheme, coding information, etc.) "C" is transmitted in a specific subframe, a UE within a cell monitors, that is, blind-decodes a PDCCH using its RNTI information in a search space. If one or more UEs have RNTI "A", these UEs receive the PDCCH and receive a PDSCH indicated by "B" and "C" based on information of the received PDCCH.

FIG. 5 illustrates resource units used to configure a control channel. Specifically, FIG. 5(a) illustrates resource units used to configure a control channel, when the number of Transmission (Tx) antennas in an eNB is 1 or 2 and FIG. 5(b) illustrates resource units used to configure a control channel, when the number of Tx antennas in an eNB is 4. Although a different reference signal (RS) pattern is used according to the number of Tx antennas, resources unit related to a control channel are configured in the same manner.

Referring to FIG. 5, a basic resource unit of a control channel is an REG. An REG includes 4 contiguous resource elements (REs) except for REs used for RSs. A bold square represents an REG in FIG. 5. A PCFICH and a PHICH include 4 REGs and 3 REGs, respectively. A PDCCH is composed of control channel elements (CCE), each CCE including 9 REGs.

To determine whether a PDCCH having L CCEs is destined for a UE, the UE is configured to monitor $M^{(L)}(\geq L)$ CCRs which are contiguous or arranged in a specific rule. The UE may consider plural L values, for PDCCH reception. CCE sets that the UE should monitor for PDCCH reception are called a search space. For example, search spaces are defined as illustrated in [Table 1] below in the LTE system.

TABLE 1

| Type | Search space $S_k^{(L)}$ | | Number of PDCCH candidates $M^{(L)}$ |
|---|---|---|---|
| | Aggregation level L | Size [in CCEs] | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

CCE aggregation level, L is the number of CCEs in a PDCCH, $S_k^{(L)}$ represents a search space of CCE aggregation level L, and $M^{(L)}$ is the number of PDCCH candidates to be monitored in a search space with CCE aggregation level L.

Search spaces may be classified into a UE-specific search space accessible only to a specific UE and a common search space accessible to all UEs. A UE monitors common search spaces with CCE aggregation levels 4 and 8 and UE-specific search spaces with CCE aggregation levels 1, 2, 4, and 8. The common search spaces may be overlapped with the UE-specific search spaces.

The position of a first CCE (i.e. a CCE with a lowest index) in a PDCCH search space assigned to a UE, for each CCE aggregation level is changed in every subframe. This is called PDCCH search space hashing.

The CCE can be distributed in a system band. In more detail, a plurality of logically consecutive CCEs may be input to an interleaver that mixes the CCEs in units of REGs. Accordingly, frequency/time resources included in one CCE are physically and dispersely distributed over entire frequency/time domains in a control region of a subframe. As a result, a control channel is configured in units of CCEs, but interleaving is performed in units of REGs, thereby maximizing frequency diversity and interference randomization gain.

Figure 6:
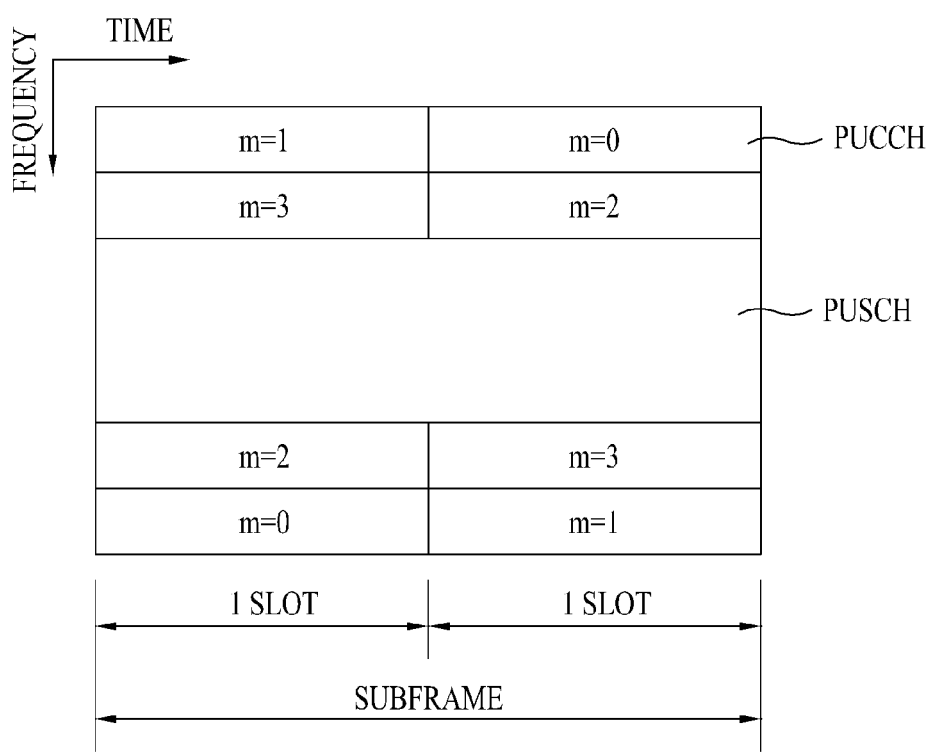
FIG. 6 illustrates a structure of an uplink (UL) subframe in an LTE system.

FIG. 6 illustrates a structure of a UL subframe in the LTE system.

Referring to FIG. 6, a UL subframe may be divided into a control region and a data region. A physical uplink control channel (PUCCH) including uplink control information (UCI) is allocated to the control region and a physical uplink shared channel (PUSCH) including user data is allocated to the data region. The middle of the subframe is allocated to the PUSCH, while both sides of the data region in the frequency domain are allocated to the PUCCH. Control information transmitted on the PUCCH may include an HARQ ACK/NACK, a CQI representing a downlink channel state, an RI for multiple input multiple output (MIMO), a scheduling request (SR) requesting UL resource allocation. A PUCCH for one UE occupies one resource block (RB) having a different frequency in each slot of a subframe. That is, the two RBs allocated to the PUCCH frequency-hop over the slot boundary of the subframe. Particularly, PUCCHs with m=0, m=1, m=2, and m=3 are allocated to a subframe in FIG. 6.

Figure 7:
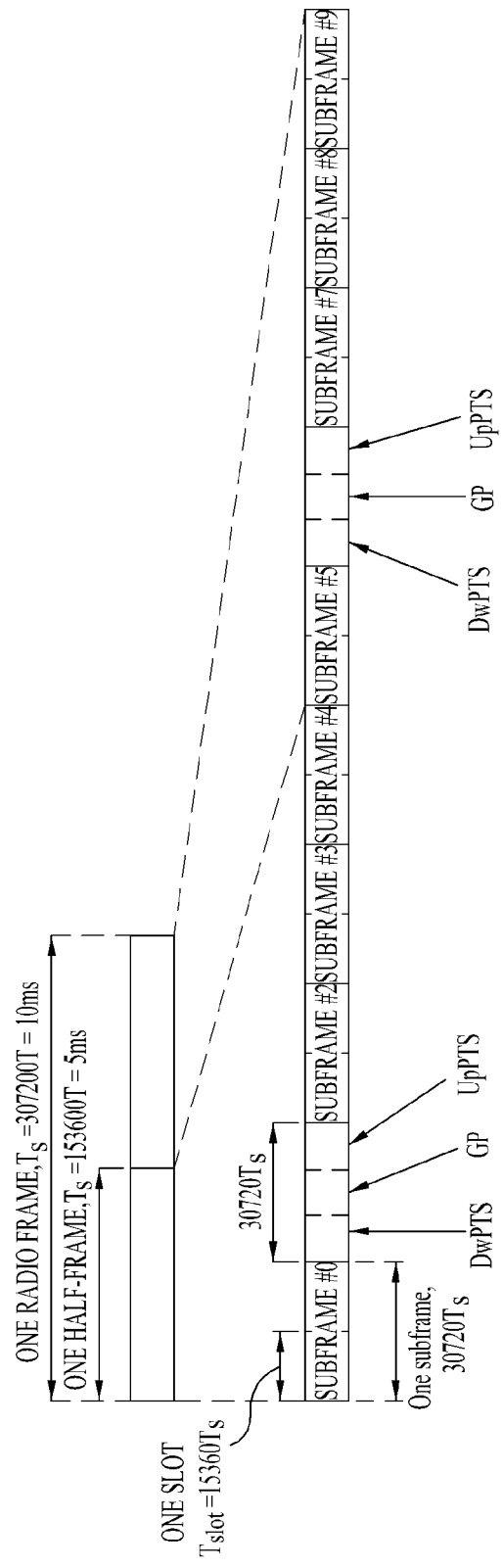
FIG. 7 illustrates a structure of a radio frame in an LTE TDD system.

FIG. 7 illustrates a structure of a radio frame in an LTE TDD system. In the LTE TDD system, a radio frame includes two half frames, and each half frame includes four normal subframes each including two slots, and a special subframe including a downlink pilot time slot (DwPTS), a guard period (GP), and an uplink pilot time slot (UpPTS).

In the special subframe, the DwPTS is used for initial cell search, synchronization, or channel estimation in a UE. The UpPTS is used for channel estimation in an eNB and uplink transmission synchronization of a UE. That is, the DwPTS is used for downlink transmission and the UpPTS is used for uplink transmission. In particular, the UpPTS is used for transmission of a PRACH preamble or SRS. In addition, the GP is a period for removing interference generated in uplink due to multipath delay of a downlink signal between uplink and downlink.

Special subframe configuration is defined in the current 3GPP standard document as shown in [Table 2] below. In [Table 2], $T_s=1/(15000\times2048)$ refers to a DwPTS and a UpPTS and the remaining region is configured as a GP.

acterized by data sharing, and CoMP-coordinated scheduling/beamforming (CoMP-CS/CB).

In downlink CoMP-JP, a UE may instantaneously receive data simultaneously from eNBs that perform CoMP transmission and may combine the received signals, thereby increasing reception performance (Joint Transmission (JT)). In addition, one of the eNBs participating in the CoMP transmission may transmit data to the UE at a specific time point (Dynamic Point Selection (DPS)). In contrast, in downlink CoMP-CS/CB, a UE may receive data instantaneously from one eNB, that is, a serving eNB by beamforming.

In uplink CoMP-JP, eNBs may receive a PUSCH signal from a UE at the same time (Joint Reception (JR)). In contrast, in uplink CoMP-CS/CB, only one eNB receives a PUSCH from a UE. Here, cooperative cells (or eNBs) may make a decision as to whether to use CoMP-CS/CB.

In a current wireless communication environment, data demands relative to a cellular network are rapidly rising due to the advent and supply of various devices that demand machine-to-machine (M2M) communication and a high data transmission capacity. To satisfy the high data demands, communication technology such as carrier aggregation technol-

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

Meanwhile, in an LTE TDD system, a UL/DL configuration is shown in Table 3 below.

ogy, etc., has been developed for effective use of more frequency bands and multi-antenna technology, multiple base

TABLE 3

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In [Table 3] above, D, U, and S refer to a downlink subframe, an uplink subframe, and the special subframe. In addition, [Table 3] also shows downlink-to-uplink switch-point periodicity in an uplink/downlink subframe configuration in each system.

It is expected that the future-generation mobile communication standard, LTE-A will support Coordinated Multi-Point (CoMP) transmission in order to increase data rate, compared to the legacy standard. CoMP refers to transmission of data to a UE through cooperation from two or more eNBs or cells in order to increase communication performance between a UE located in a shadowing area and an eNB (a cell or sector).

CoMP transmission schemes may be classified into CoMP-Joint Processing (CoMP-JP) called cooperative MIMO charstation cooperation technology, etc. has been developed for increase in data capacity in a limited frequency. In addition, a communication environment has evolved toward a tendency that a density of accessible nodes around a user is increasing. A system including a node having this high density can achieve higher system performance using cooperation between nodes. According to this method, nodes respectively operates as a base station (BS), an advanced BS (ABS), a node-B (NB), eNode-B (eNB), an access point (AP), etc., which are independent of each other, to achieve excellent performance compared to a case without cooperation.

Figure 8:
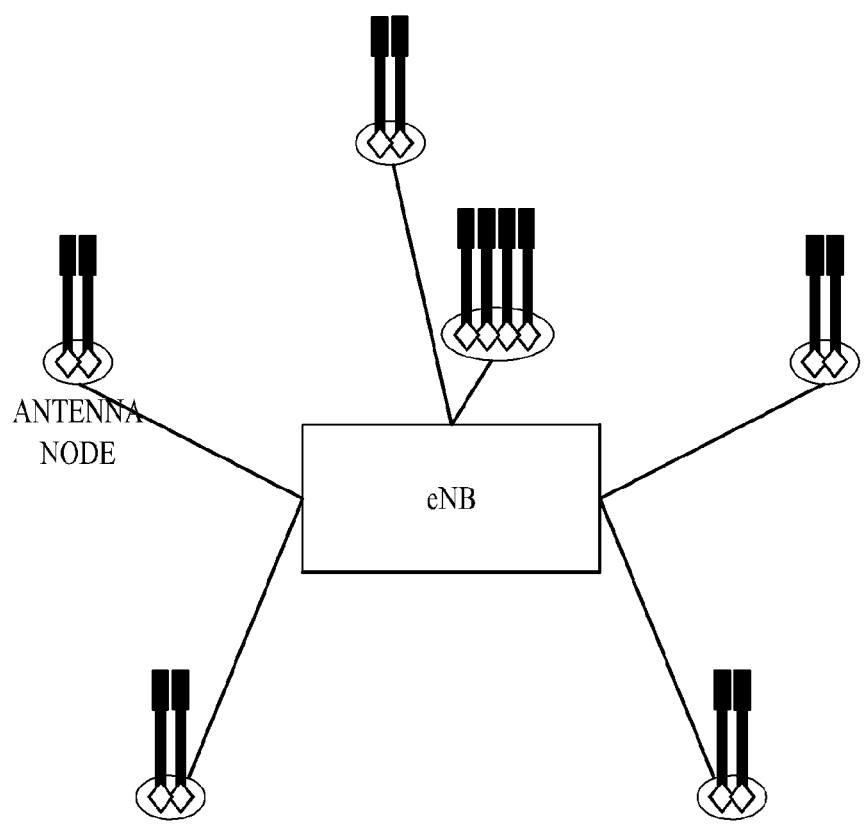
FIG. 8 is a diagram illustrating a multi-node system in a next-generation communication system.

FIG. 8 is a diagram illustrating a multi-node system in a next-generation communication system.

Referring to FIG. 8, if the system is configured in such a way that transmission and reception of all nodes are managed by one controller and each node operates as some antenna group included in one cell, the system may be a distributed multi node system (DMNS) constituting one cell. In this case, the nodes may be assigned respective node identifiers (IDs) or may operate as some antennas included in the cell without separate node IDs. However, when nodes have respective different cell IDs, the system may be a multi-cell system. When multiple cells overlap according to coverage, the system is called a multi-tier network.

A node-B, an eNode-B, a PeNB, an HeNB, a remote radio head (RRH), a relay, a distributed antenna, etc. may be a node and a minimum of one antenna is installed per node. The node may also be called a transmission point. Although the node usually refers to an antenna group in which antennas are spaced apart from each other by a predetermined interval or more, the present invention can be applied to an arbitrary antenna group irrespective of intervals.

According to the advent of the aforementioned multi-node system and relay node, it may be possible to apply various communication schemes to improve channel quality. However, in order to apply the aforementioned MIMO scheme and inter-cell cooperative communication scheme to a multiple node environment, there is a need to introduce a new control channel. The new control channel being discussed due to this need is an enhanced-PDCCH (E-PDCCH) and is determined to be allocated to a data region (hereinafter, referred to as a 'PDSCH region') instead of an existing control region (hereinafter, referred to as a 'PDCCH region'). In conclusion, it may be possible to transmit control information of a node per UE through the E-PDCCH and thus the problem in terms of the existing insufficient PDCCH region can also be overcome. For reference, the E-PDCCH may not be provided to the legacy UE but may be received by an LTE-A UE only. In addition, the E-PDCCH is transmitted and received based on a DM-RS as a UE-specific RS as well as a CRS as a legacy cell-specific RS.

Here, for example, the PDSCH region is defined as a region including the remaining OFDM symbols obtained by excluding some initial OFDM symbols used as a legacy PDCCH from a subframe including a plurality of OFDM symbols. However, there is no OFDM symbol used as a PDCCH, and thus it is possible to determine and use all OFDM symbols of the corresponding subframe.

Figure 9:
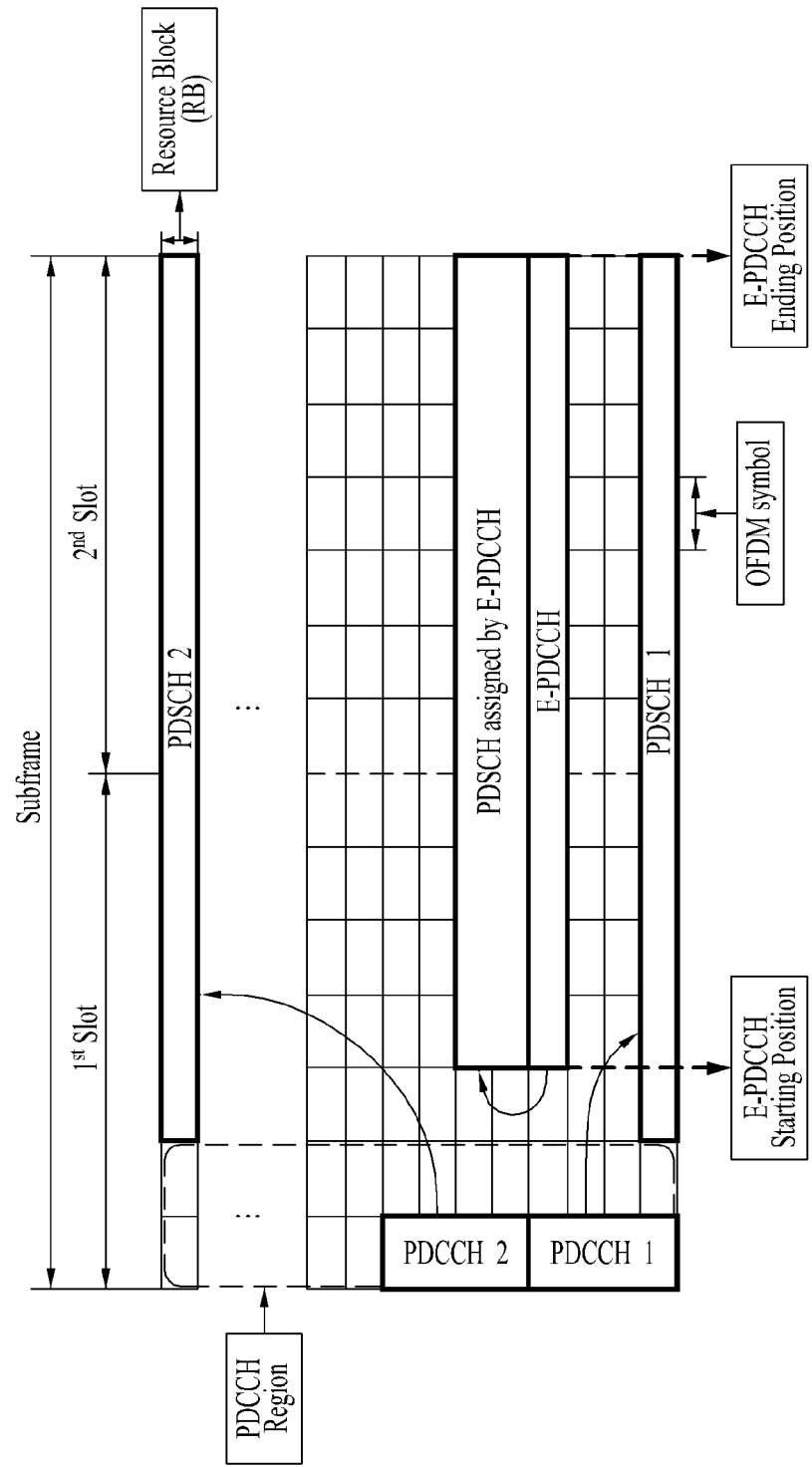
FIG. 9 is a diagram illustrating a PDSCH that is scheduled by an E-PDCCH and an E-PDCCH.

FIG. 9 is a diagram illustrating a PDSCH that is scheduled by an E-PDCCH and an E-PDCCH.

As seen from FIG. 9, PDCCH 1 and PDCCH 2 schedule PDSCH 1 and PDSCH 2, respectively, and an E-PDCCH schedules other PDSCHs. In particular, FIG. 9 illustrates that an E-PDCCH is transmitted in a last symbol from a fourth symbol as a start symbol.

In general, the E-PDCCH may be transmitted through a PDSCH region for transmitting data, and a UE needs to perform blind decoding on a search region for an E-PDCCH in order to detect whether the E-PDCCH of the UE is present.

Hereinafter, an RS will be described in more detail.

In general, an RS that is known to both a transmitting side and a receiving side is transmitted to the receiving side from the transmitting side together with data in order to measure a channel. The RS indicates a modulation scheme as well as channel measurement to facilitate a demodulation procedure. The RS is classified into a dedicated RS (DRS) for an eNB and a specific UE, that is, a UE-specific RS, and a common RS (CRS) as a cell-specific RS for all UEs in a cell. In addition, the cell-specific RS includes an RS for measuring CQI/PMI/RI and reporting the CQI/PMI/RI to an eNB by a UE and is referred to as a channel state information-RS (CSI-RS).

Figure 10:
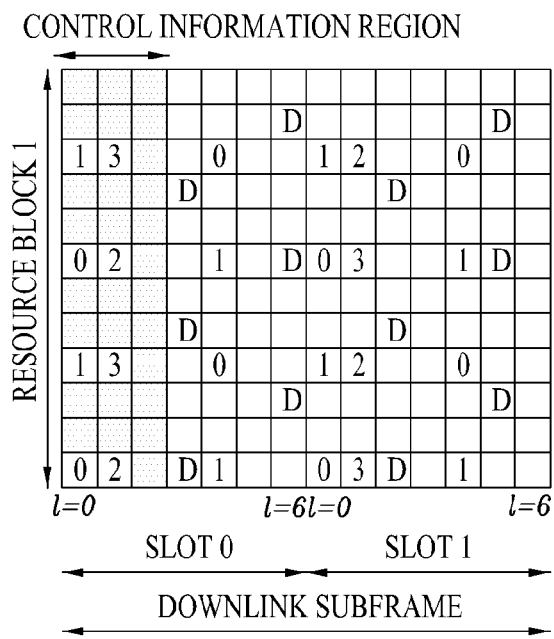
FIGS. 10 and 11 illustrate structures of RSs in an LTE system that supports downlink transmission using four antennas.
Figure 11:
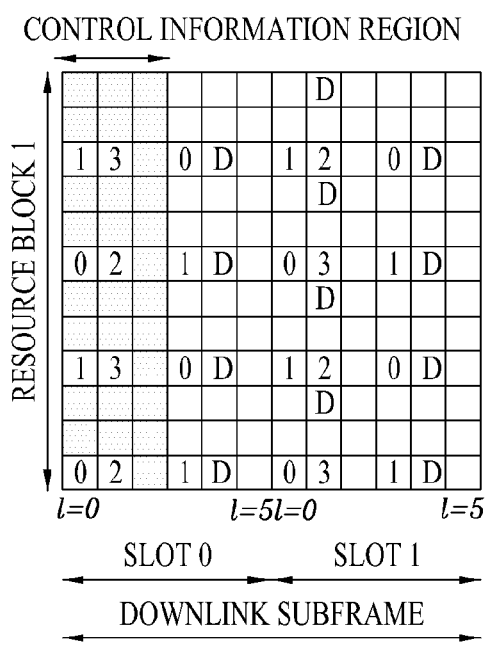

FIGS. 10 and 11 illustrate structures of RSs in an LTE system that supports downlink transmission using four antennas. In particular, FIG. 10 illustrates the case of normal cyclic prefix, and FIG. 11 illustrates the case of extended cyclic prefix.

Referring to FIGS. 10 and 11, 0 to 3 written on lattices refer to a CRS as a cell-specific RS that is transmitted for channel measurement and data demodulation to correspond to antenna ports 0 to 3, respectively. The CRS as a cell-specific RS may be transmitted to a UE overall a control information region as well as a data information region.

In addition, 'D' written on the lattices refers to a downlink demodulation (DM-RS) as a UE-specific RS, and the DM-RS supports single antenna port transmission through a data region, that is, a PDSCH. A UE receives information about whether the DM-RS as a UE-specific RS through a higher layer via signaling. FIGS. 10 and 11 illustrate an example of a DM-RS corresponding to an antenna port 5 and also define a DM-RS for antenna ports 7 to 14, i.e., 8 of total antenna ports in the 3GPP standard document 36.211.

Figure 12:
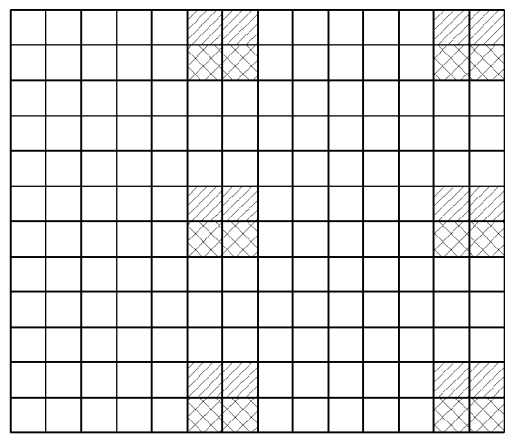
FIG. 12 illustrates an example of allocation of a DM-RS defined in the current 3GPP standard document.

FIG. 12 illustrates an example of allocation of a DM-RS defined in the current 3GPP standard document.

Referring to FIG. 12, in a DM-RS group 1, DM-RSs corresponding to antenna ports {7, 8, 11, and 13} are mapped via a code division multiplexing scheme using a sequence per antenna port, and in a DM-RS group 2, DM-RSs corresponding to antenna ports {9, 10, 12, and 14} are similarly mapped via a code division multiplexing scheme using a sequence per antenna port.

The aforementioned CSI-RS is proposed for channel measurement with respect to a PDSCH separately from a CRS and may be defined as a maximum of 32 resource configurations in order to reduce inter-cell interference (ICI) in a multi-cell environment unlike the CRS.

Figure 13:
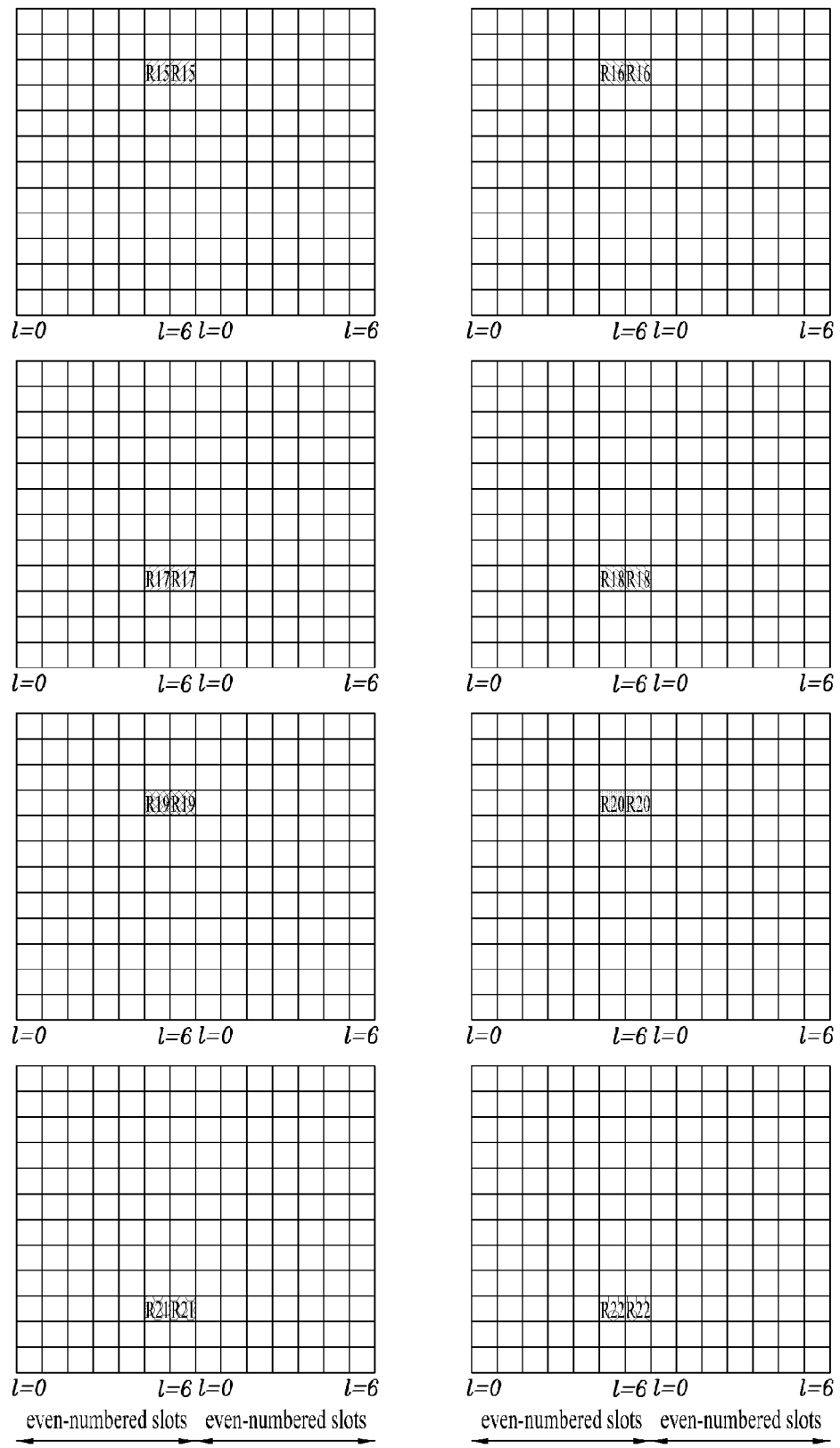
FIG. 13 illustrates CSI-RS configuration #0 of the case of a normal CP among CSI-RS configurations defined in the current 3GPP standard document.

The CSI-RS (resource) configurations are different according to the number of antenna ports and are configured to transmit a CSI-RS defined in different (resource) configurations if possible between adjacent cells. The CSI-RS supports a maximum of 8 antenna ports unlike the CRS and 8 of total antenna ports of antenna ports 15 to 22 are allocated to antenna port for the CSI-RS in the 3GPP standard document. FIG. 13 illustrates CSI-RS (resource) configuration #0 of the case of a normal CP among CSI-RS configurations defined in the current 3GPP standard document.

<First Embodiment>

The present invention proposes a method for effectively forming a corresponding configuration unit in a pre-configured resource region when an E-PDCCH includes a set of predefined configuration units. Here, the configuration unit of the E-PDCCH may be referred to as an enhanced REG (E-REG) (or an enhanced-CCE (E-CCE)). In addition, one E-PDCCH may include a plurality of E-REGs or a plurality of E-CCEs, and the number of E-REGs or E-CCEs included in the E-PDCCH may be predefined. In addition, the E-REG may be used to configure an aggregation level of N E-CCEs, that is, N E-CCEs included in the E-PDCCH in the distributed or localized form. In the present invention, the term 'E-PDCCH' may be interpreted as the meaning of an EPDCCH PRB pair, an EPDCCH set, control information, an E-CCE, or the like.

Hereinafter, it is assumed that one E-PDCCH includes N E-REGs for convenience of description. Here, the E-REG may be formed based on a plurality of REs according to a predefined rule.

The N E-REG included in the E-PDCCH may have different numbers (or different properties) of REs according to whether a specific RS is transmitted on corresponding time/frequency resource regions (e.g., a predefined number of PRB pair). Accordingly, the present invention proposes a method for N E-REGs used for E-PDCCH configuration, which have the same number (or the same properties) of REs irrespective of whether a specific RS is transmitted on corresponding time/frequency resource regions. Here, the specific RS may be an interference RS such as a CSI-RS (or a multiple CSI-RS when a CoMP scheme is applied), a CRS, a DRS, a DM-RS, a zero power (ZP) CSI-RS determined for various uses, or a CRS of an adjacent cell that is rate-matched or punctured in a specific cell.

In general, when a specific RS is transmitted, corresponding RS REs cannot be used for an E-REG configuration of an E-PDCCH. In addition, corresponding REs cannot also be used for an E-REG configuration of an E-PDCCH when a specific cell performs rate-matching or puncturing on REs of a related position in order to alleviate interference generated due to transmission of a specific RS (e.g., a CRS) of an adjacent cell. In consideration of this point, according to the present invention, N E-REGs for an E-PDCCH configuration may have the same number of RS REs (or REs that can be used for RS transmission or REs associated with an interference RS of an adjacent cell that is rate-matched or punctured in a specific cell). Accordingly, even if the RS REs (or REs that can be used for RS transmission or REs associated with an interference RS of an adjacent cell that is rate-matched or punctured in a specific cell) are excluded from an E-REG configuration, an E-REG including the same number of REs can be embodied. Here, the RS REs refer to one or more REs used for corresponding RS transmission when RS transmission is configured.

For example, in the case of 2 antenna port CRS including antenna port #0 and antenna port #1, the corresponding CRS is transmitted through 16 of total REs that are equally distributed in each E-REG. Similarly, in the case of 2 antenna port CRS including antenna port #2 and antenna port #3, 8 of total REs are also equally distributed in each E-REG.

In addition, in the case of CSI-RS, a mapping rule of an E-REG and an RE may be defined so as to equally distribute four REs defined by one 4 antenna port CSI-RS configuration or 8 REs defined by one 8 antenna port CSI-RS configuration in each E-REG.

In this E-REG configuration, an operation of distributing REs included in a CRS for an E-REG in an OFDM symbol in which a CRS is transmitted and distributing REs included in a CSI-RS for an E-REG in an OFDM symbol in which a CRS is not transmitted is a help to an operation for maintaining the number of REs of an E-REG according to whether an RS is configured, as described above.

In addition, a rule for equally distributing specific RS REs (or REs that can be used for RS transmission or REs associated with an interference RS of an adjacent cell that is rate-matched or punctured in a specific cell) for N E-REGs for an E-PDCCH configuration may be changed according to a PRB pair index. Here, the PRB pair may refer to only PRB pairs present in a frequency resource domain that is pre-set as a search region of an E-PDCCH or PRB pairs present on an allocated downlink system band. An eBN may apply a rule change to the corresponding PRBs according to a scope of a pre-defined PRB pair.

FIG. 14 illustrates an example in which an E-REG included in an E-PDCCH is formed in one PRB pair according to a first embodiment of the present invention. In particular, in FIG. 14, in the case of normal CP, it is assumed that 8 antenna ports for a CSI-RS are applied, and in particular, it is assumed that the number of symbols used for legacy PDCCH transmission in one subframe is 2 and an E-PDCCH includes 8 of total E-REGs (i.e., E-REG #0 to E-REG #7).

Referring to FIG. 14(a), an E-REG #N may include REs with an index #N, obtained by excluding REs used for RS transmission. As seen from FIG. 14(a), according to the present invention, when indexing is performed on REs included in an E-REG, REs used for 8 antenna port CSI-RS, 8 antenna port DM-RS, and 4 antenna port CRS transmission can be equally distributed for an E-REG.

FIG. 14(b) illustrates an example in which REs having a specific E-REG index are collected and re-arranged in an opposite direction of a frequency axis in FIG. 14(a). As seen from FIG. 14(b), REs used for RS transmission and REs used for legacy PDCCH transmission can be equally distributed for each respective E-REG index, and simultaneously, the numbers of available REs between different E-REG indexes can be the same.

FIG. 15 illustrates another example in which an E-REG included in an E-PDCCH is formed in one PRB pair according to the first embodiment of the present invention.

In particular, FIG. 15(a) assumes the case in which there is no legacy PDCCH transmission in one subframe like recently discussed new carrier type (NCT) or an extension carrier, the case in which 8 antenna port CSI-RS, 8 antenna port DM-RS, and 4 antenna port CRS are configured, and the case of normal CP. Needless to say, it is assumed that an E-PDCCH includes 8 of total E-REGs (i.e., E-REG #0 to E-REG #7).

Furthermore, FIG. 15(b) illustrates an example in which REs having specific E-REG index are collected and re-arranged in an (opposite) direction of a frequency axis in FIG. 15(a). As seen from FIG. 15(b), REs used for RS transmission and REs used for legacy PDCCH transmission can be equally distributed for each respective E-REG index, and simultaneously, the numbers of available REs between different E-REG indexes can be the same.

Figure 16:
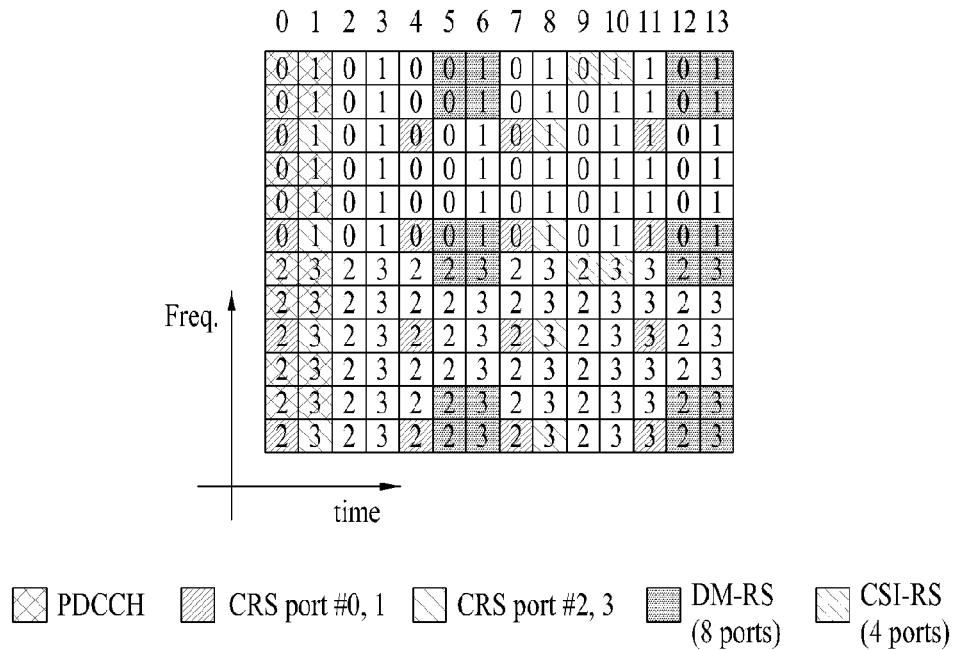
FIG. 16 illustrates another example in which an E-REG included in an E-PDCCH is formed in one PRB pair according to the first embodiment of the present invention.

FIG. 16 illustrates another example in which an E-REG included in an E-PDCCH is formed in one PRB pair according to the first embodiment of the present invention. However, FIG. 16 is different from FIGS. 14 and 15 in that the number of CSI-RS antenna ports and DM-RS antenna ports is 4 and an E-PDCCH includes 4 of total E-REGs (i.e., E-REG #0 to E-REG #3).

As seen from FIGS. 14 to 16, according to the present invention, when an E-PDCCH is configured by 8 E-REGs or 4 E-REGs in one PRB pair region, the same number of REs (or the same number of REs used for an RS) between the E-REGs can be allocated.

An indexing method for REs included in the E-REG illustrated in FIGS. 14 to 16 is merely an example. Various indexing methods for REs used for corresponding RS transmission can be embodied as long as the methods are indexing methods for equally distributing RS REs to an E-REG and can allocate the same number of RS REs to each E-REG. Needless to say, the indexing method can also be extensively applied to the case in which one, or three or more OFDM symbols used for legacy PDCCH transmission are configured or the case in which an extended CP as a CP length is applied.

Meanwhile, according to the present invention, when an E-REG is configured, a rule may be determined to configure an E-REG or E-REG set by assuming a predefined specific number of antenna ports or the maximum number of antenna ports (e.g., 4 antenna port CRS in the case of CRS) as an antenna port configuration for a predetermined RS. Here, this rule may be pre-signaled to a UE from an eNB via a higher layer signal or a physical layer signal. For example, in the case of CRS, it may be assumed that a constant number (a constant port number) of CRSs are always transmitted irrespective of whether a CRS is actually transmitted, and a corresponding RE may be operated not to be allocated to an E-REG. For example, the number of antenna ports of the CRS, which is assumed in FIGS. 14 to 16, may be interpreted as a form obtained by assuming a maximum antenna port number of a CRS irrespective of whether a CRS is actually transmitted. Needless to say, an E-REG may be configured to change the assumption for the number of antenna ports for a specific RS according to a PRB pair index.

In addition, the aforementioned indexing method for an E-REG configuration can be applied in the same way to a symbol in which no RS RE is present. That is, RE indexing for an E-REG configuration in the symbol in which no RS RE is present may be shifted and can also be applied in the same way to a symbol in which an RS RE is present. As seen from FIGS. 14 and 16, the RE indexing method in an OFDM symbol, in which an RS is transmitted, is applied in the same way as the RE indexing method in an OFDM symbol in which an RS is not transmitted.

Inversely, an actual E-REG associated with a corresponding index may be configured based on indexes of the remaining REs obtained by excluding corresponding REs in a symbol in which an RS RE is present. For example, when a symbol, in which an RS is transmitted, is defined as symbol #n and a symbol, in which an RS is not transmitted, is defined as symbol #(n+1), an RE indexing method for an E-REG configuration applied to symbol #(n+1) can be applied in the same way to symbol #n. This method can be embodied by applying the RE indexing method for an E-REG configuration in a symbol in which an RS RE is present, to a symbol in which an RS RE is not present in the same way.

Furthermore, an RE indexing method for an E-REG configuration in a symbol in which an RS RE is present (or is not present) may be configured to be changed according to a PRB pair index. When this method is applied, the RE indexing method for an E-REG configuration in a symbol in which an RS RE is present can also be applied in the same way to a symbol in which an RS RE is not present.

As another method, when an E-REG is configured, an RE indexing method can be pre-configured to be changed in terms of a frequency domain (e.g., a subcarrier unit) in units of symbols (or a symbol group). For example, in a specific symbol #n, when it is assumed that an RE indexing method in a subcarrier unit is applied in an order of (0)-(1)-(2)-(3)-(4)- . . . -(N), a rule may be determined to configure (1)-(2)-(3)-(4)- . . . -(N)-(0), to which 1 subcarrier is applied, based on a predetermined cyclic shifting offset value in symbol #(n+1). Here, it is assumed that subcarrier #k as a reference start point configured for RE indexing in a subcarrier unit is the same in the cases of symbol #n and symbol #(n+1). Here, subcarrier #k may be configured as subcarrier #0.

Information about whether the aforementioned indexing method is applied and information associated therewith (e.g., a cyclic shifting offset value for each OFDM symbol (symbol group), a reference start point for RE indexing, or the like) may be pre-signaled to a UE from an eNB via a higher layer signal or a physical layer signal. Furthermore, as seen from FIGS. 14 and 15, this method can be usefully applied in order to equally distribute 8 antenna port DM-RS RE (and an available RE used for actual E-PDCCH transmission information) to an E-REG. Here, in particular, FIGS. 14 and 15 illustrate the case in which a cyclic shifting offset value is configured as 1 subcarrier between OFDM symbols #12 and #13 and OFDM symbols #5 and #6 used for DM-RS transmission. In this case, this can be interpreted as if a cyclic shifting offset value is configured as 0 between OFDM symbol #12 and OFDM symbol #13 or between OFDM symbol #5 and OFDM symbol #6. Similarly, a rule for changing an RE indexing method for an E-REG configuration in terms of the frequency domain in units of symbols (symbol group) can be configured to be further changed according to a PRB pair index.

Meanwhile, when RE indexing for available REs is actually performed on an E-REG configuration in a symbol in which an RS RE is present, an RE indexing method may also be defined to allocate the same number of REs to N E-REGs included in an E-PDCCH in the corresponding symbol. Here, actual available REs for an E-REG configuration may be defined as the remaining REs obtained by excluding specific RS REs or as REs (e.g., REs obtained by excluding REs used for legacy PDCCH symbol transmission) that are actually used for an E-REG configuration among the remaining REs obtained by excluding specific RS REs. In addition, when a legacy PDCCH symbol is punctured in a specific subframe, a rule may be pre-configured to vary an E REG (or E-REG indexing) used for each subcarrier (or subcarrier group) in one OFDM symbol. According to this method, REs that cannot be used due to puncturing of a legacy PDCCH symbol can be equally distributed as possible to N E-REGs included in an E-PDCCH. Similarly, this rule can be configured to be changed according to a PRB pair index.

In addition, a pattern for allocating an RE to an E-REG for each subcarrier can be changed in an OFDM symbol in which a CRS is present. For example, when an RE is first mapped to an E-REG according to a predetermined pattern at a location (e.g., REs used for CRS transmission) where a CRS is transmitted, REs of an OFDM symbol in which a CRS is present may be mapped to an E-REG using a pattern obtained by applying v-shift to the predetermined pattern in terms of subcarrier. In this case, when only the v-shift is applied, REs mapped to a specific E-REG are repeated in a specific OFDM symbol. In this case, when the corresponding symbol is used as a legacy PDCCH (or when a legacy PDCCH is punctured), a problems arises in that only the corresponding specific E-REG loses REs. As one method for preventing this problem, when v-shift is applied to an E-REG allocation pattern for a CRS RE, the pattern can be changed based on a predetermined rule.

Figure 17:
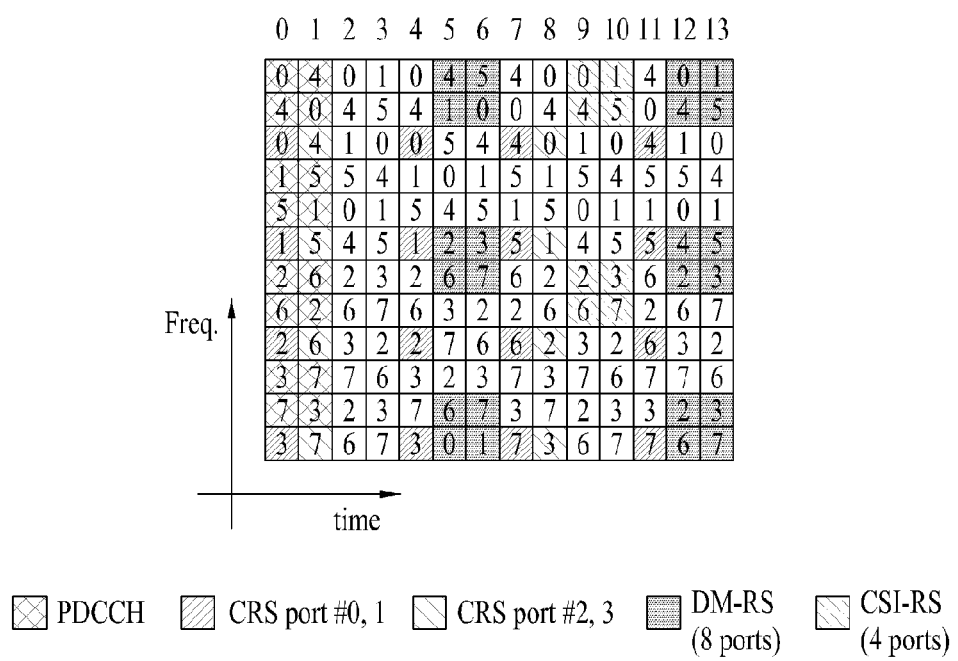
FIG. 17 illustrates an example in which v-shift is applied to an E-REG allocation pattern for a CRS RE according to a first embodiment of the present invention.

FIG. 17 illustrates an example in which v-shift is applied to an E-REG allocation pattern for a CRS RE according to a first embodiment of the present invention.

In particular, FIG. 17 assumes a situation in which a CP length is a normal CP, the number of CSI-RS antenna ports is configured as 8, the number of DM-RS antenna ports is configured as 8, and the number of CRS antenna ports is configured as 4. In addition, it is assumed that the number of symbols used for legacy PDCCH transmission in one subframe is 2 and an E-PDCCH includes 8 of total E-REGs (i.e., E-REG #0 to E-REG #7). In addition, FIG. 17 applies a method for changing an RE indexing method in subcarrier units as symbol units and a method for changing an E-REG used for each subcarrier in one OFDM symbol. For example, it is assumed that a cyclic shifting offset value is configured as 1 (subcarrier) between OFDM symbols #5, #6 and #12, #13 in which a DM-RS is transmitted, in order to equally distribute DM-RS REs for each of 8 E-REGs when the number of DM-RS antenna ports is configured as 8.

Referring to FIG. 17, REs corresponding to locations of CRS antenna ports #0 and #1 are first allocated to an E-REG according to a predefined pattern, and a number obtained by adding a predetermined offset (e.g., it is assumed that the offset is 4 in FIG. 17) during v-shift of the corresponding pattern is an E-REG index.

Needless to say, when the offset is equal to or greater than the total number of E-REGs, a modular operation may be performed on the number of total E-REGs. Here, when v-shift is added once more, an offset is applied twice. In the case of FIG. 17, an offset value corresponds to half the total number of E-REGs, the case in which an offset is applied twice is the same as the case in which an offset is not applied. As a result, in OFDM symbol #0 of FIG. 17, REs are allocated to an E-REG along a pattern such as "0, 4, 0, 1, 5, 1, 2, 6, 2, 3, 7, 3" according to a subcarrier. In addition, an offset value applied during v-shift may be changed according to an antenna port number configuration of a predetermined specific RS (e.g., a CRS). This changing operation may be implicitly performed or corresponding information may be directly signaled to a UE from an eNB via a higher layer signal or a physical layer signal. Furthermore, this method for applying an offset can also be applied in a similar manner in an OFDM symbol (e.g., a symbol in which a CRS is not transmitted) in which a mapping rule between an E-REG and an RE is defined based on a CSI-RS (or DM-RS) RE. Similarly, these rules can also be configured to be changed according to a PRB pair index.

FIGS. 18 to 23 illustrate examples in which an E-REG included in an E-PDCCH is formed in one PRB pair according to a first embodiment of the present invention.

Figure 18:
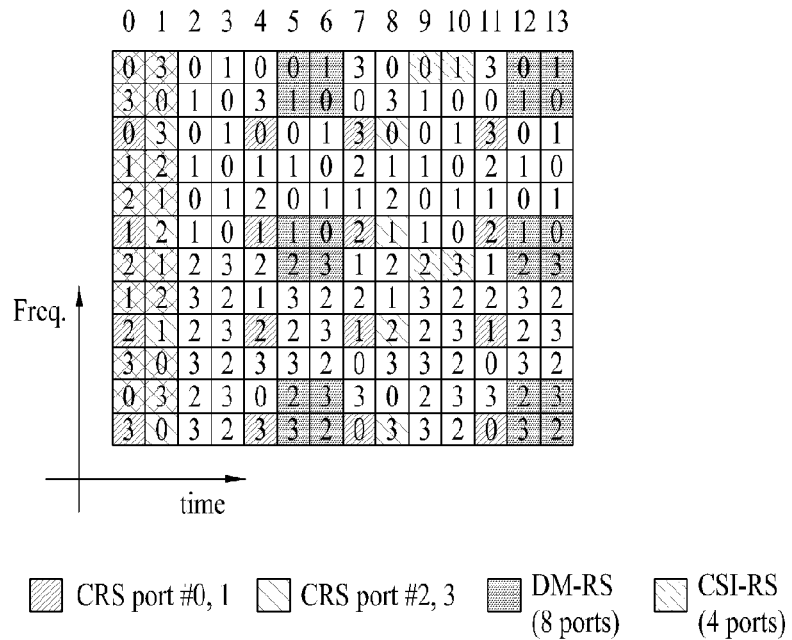
FIGS. 18 to 23 illustrate examples in which an E-REG included in an E-PDCCH is formed in one PRB pair according to a first embodiment of the present invention.

First, FIG. 18 assumes a situation in which a CP length is a normal CP, the number of CSI-RS antenna ports is configured as 4, the number of DM-RS antenna ports is configured as 4, and the number of CRS antenna ports is configured as 4. In addition, it is assumed that the number of symbols used for legacy PDCCH transmission in one subframe is 2 and an E-PDCCH includes 4 of total E-REGs (i.e., E-REG #0 to E-REG #3).

Figure 19:
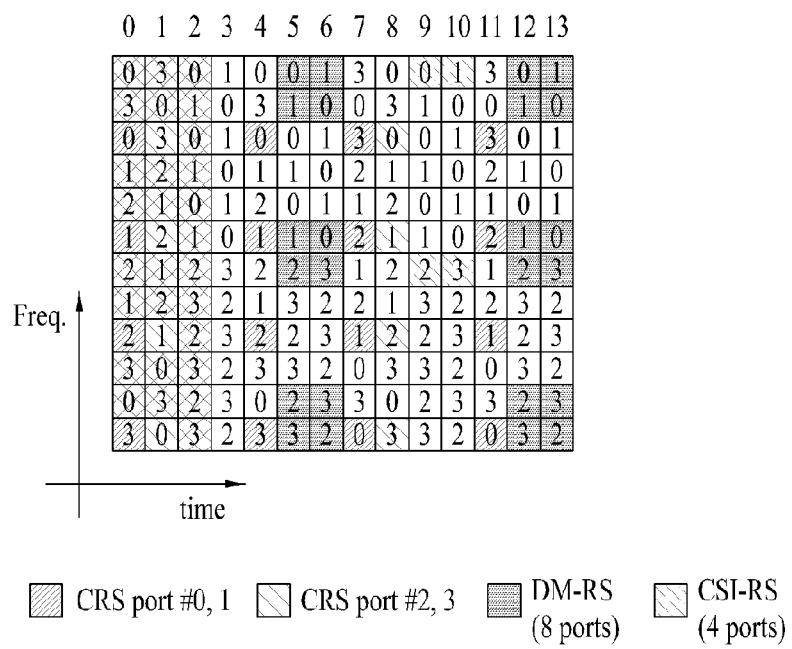

FIG. 19 also assumes a situation in which a CP length is a normal CP, the number of CSI-RS antenna ports is configured as 4, the number of DM-RS antenna ports is configured as 4, and the number of CRS antenna ports is configured as 4, and assumes that an E-PDCCH includes 4 of total E-REGs (i.e., E-REG #0 to E-REG #3). However, it is assumed that the number of symbols used for legacy PDCCH transmission is 3 in one subframe. In particular, referring to FIG. 19, this can be effectively applied in a special subframe of a TDD system.

Figure 20:
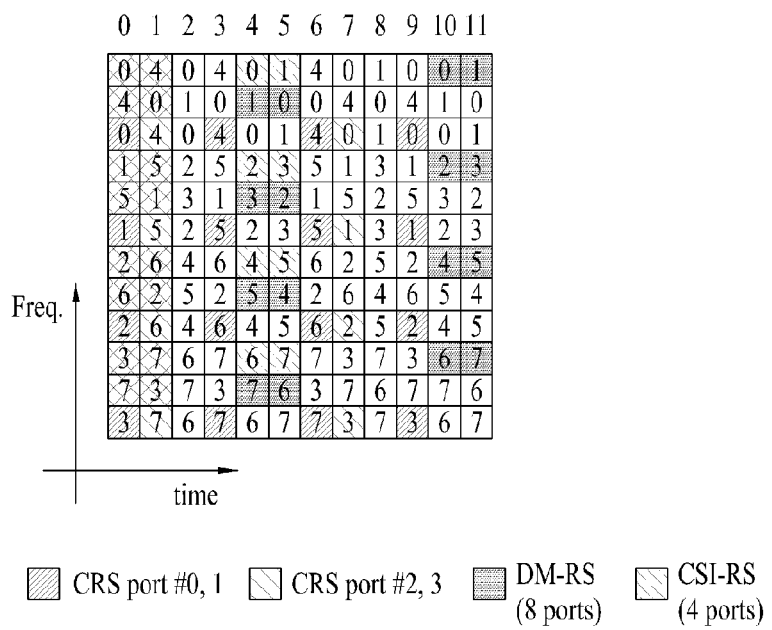

FIG. 20 assumes a situation in which a CP length is an extended CP, the number of CSI-RS antenna ports is configured as 8, the number of DM-RS antenna ports is configured as 2, and the number of CRS antenna ports is configured as 4. In addition, it is assumed that an E-PDCCH includes 8 of total E-REGs (i.e., E-REG #0 to E-REG #7) and the number of symbols used for legacy PDCCH transmission in one subframe is 2.

Figure 21:
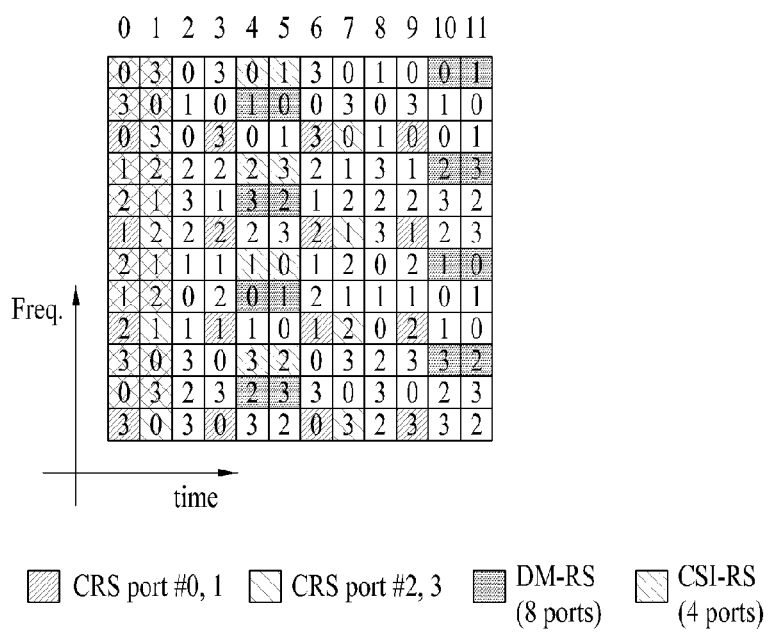

In addition, FIG. 21 assumes a situation in which a CP length is an extended CP, the number of CSI-RS antenna ports is configured as 4, the number of DM-RS antenna ports is configured as 2, and the number of CRS antenna ports is configured as 4. It is assumed that an E-PDCCH includes 4 of total E-REGs (i.e., E-REG #0 to E-REG #3) and the number of symbols used for legacy PDCCH transmission in one subframe is 2.

Figure 22:
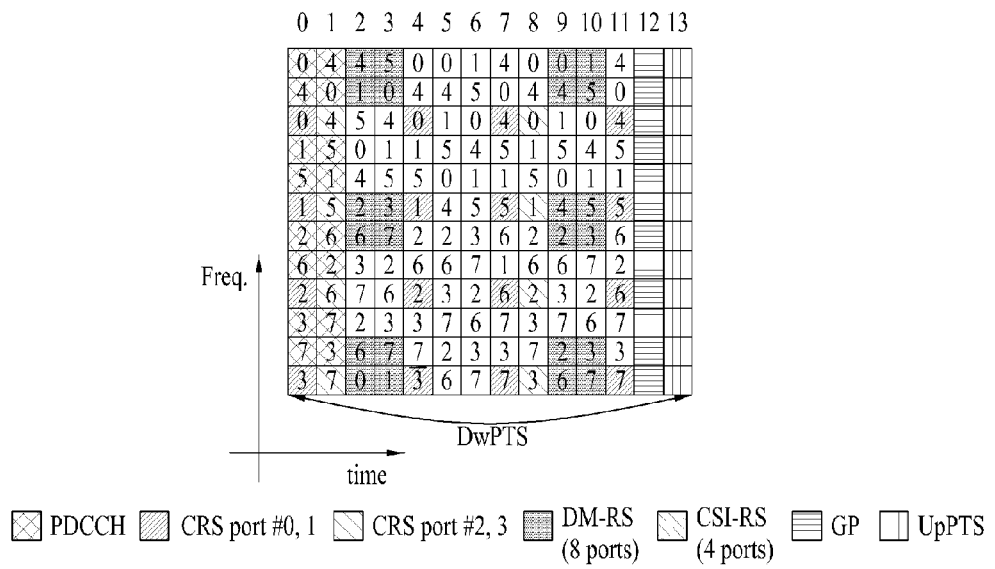
Figure 23:
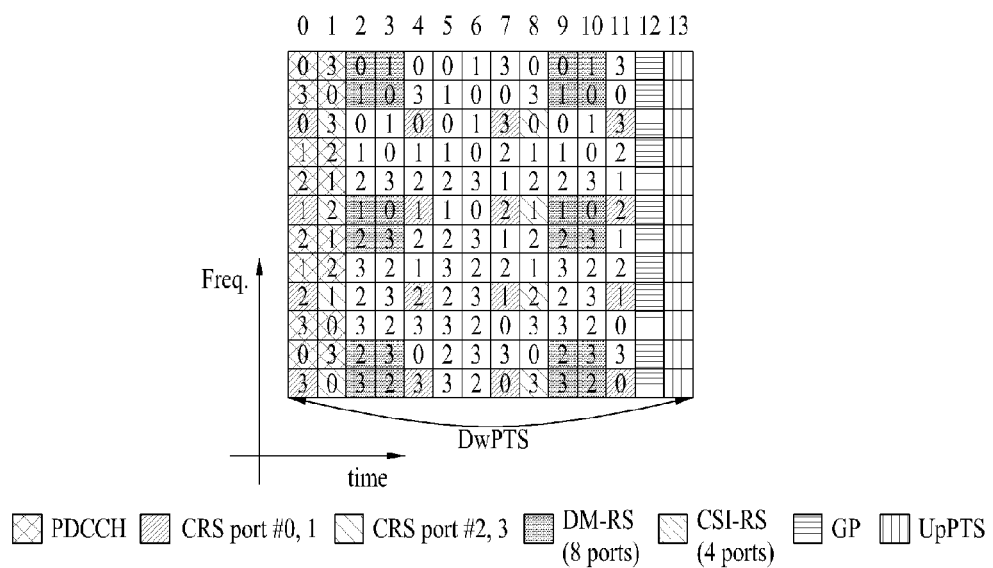

FIGS. 22 and 23 illustrate the case of a special subframe of a TDD system. In detail, FIG. 22 assumes the case in which the number of DM-RS antenna ports is 8 and the number of CRS antenna ports is 4 in DwPTS, and the case of normal CP.

In addition, the number of symbols used for legacy PDCCH transmission in one subframe is assumed to be 2, a special subframe configuration is assumed to be #4, and an E-PDCCH is assumed to include 8 of total E-REGs (i.e., E-REG #0 to E-REG #7). Furthermore, it is assumed that a cyclic shifting offset value is configured as 1 (subcarrier) between OFDM symbols #2, #3 and #9, #10 in which a DM-RS is transmitted, in order to equally distribute DM-RS REs for each of 8 E-REGs when the number of DM-RS antenna ports is configured as 8.

Lastly, FIG. 23 assumes the case in which the number of DM-RS antenna ports is configured as 4 and the number of CRS antenna ports is configured as 4 in DwPTS, and the case of normal CP. In addition, the number of symbols used for legacy PDCCH transmission in one subframe is assumed to be 2, a special subframe configuration is assumed to be #4, and an E-PDCCH is assumed to include 4 of total E-REGs (i.e., E-REG #0 to E-REG #3).

Needless to say, the examples illustrated in FIGS. 22 and 23 can be also applied in the same way to special subframe configuration #3 or #8.

In addition, as described above, REs included in one E-REG may be divided and then re-indexing of an E-REG including the corresponding REs may be further performed.

According to the E-REG re-indexing method, a rule may be predefined to re-set an index of an E-REG to which a corresponding RE belongs in an ascending order (or a descending order) with respect to REs included in an E-REG in which re-indexing is not performed, while search is performed in a direction of frequency axis or time axis. In addition, a rule may be predefined so as not to increase or reduce a re-index value of an E-REG with respect to REs included in an E-REG in which re-indexing has been performed, while search is performed in a direction of frequency axis or time axis.

For example, when E-REG re-indexing is performed in a direction of frequency axis, E-REG re-indexing may be performed in such a way that RE index #3 is E-REG #0, RE index #0 is E-REG #1, RE index #2 is E-REG #2, and RE index #1 is E-REG #3 in FIG. 21. In more detail, when search is performed in a direction of a frequency axis in a first OFDM symbol, since E-REG re-indexing is not applied to first and second RE index #3 and RE index #0, RE index #3 and RE index #0 are re-indexed to E-REG #0 and E-REG #1 in an ascending order, respectively. However, re-indexing is already applied to a third RE index #3, and thus, re-indexing is not further applied and an E-REG index value is not increased. Meanwhile, E-REG re-indexing is not applied to fourth and fifth RE index #2 and RE index #1, and thus, RE index #2 and RE index #1 are re-indexed to E-REG #2 and E-REG #3 an ascending order, respectively.

As another method, when E-REG re-indexing is performed, a rule may be defined to perform E-REG re-indexing in a direction of frequency axis or time axis using only REs in an OFDM symbol in which REs used for specific RS transmission are located.

Here, the OFDM symbol in which REs used for specific RS transmission are located may be set based on a specific RS transmitted from a serving cell of a corresponding UE or a specific RS transmitted from a predefined specific transmission point (TP). This information may be signaled to a UE from an eNB via a higher layer signal or a physical layer signal. For example, in FIG. 21, when E-REG re-indexing is performed in a direction of frequency axis in an OFDM symbol in which REs used for CSI-RS transmission of a serving cell are located, E-REG re-indexing may be performed in such a way that RE index #3 is E-REG #0, RE index #2 is E-REG #1, RE index #1 is E-REG #2, and RE index #0 is E-REG #3.

In the aforementioned E-REG re-indexing method, when there is no region to be searched in a preset frequency domain (e.g., a PRB pair) any more, a rule may be determined in such a way that the search proceeds in a direction of time axis in a predefined unit, for example, in a unit of 1 OFDM symbol and continuously E-REG re-indexing is performed in a direction of frequency axis. Needless to say, when search is performed in the time domain, if there is no region to be searched in a preset time domain (e.g., a subframe), the search proceeds in a direction of frequency axis in a unit of 1 subcarrier and then E-REG re-indexing is performed in a direction of time axis.

A rule may be determined in such a way that, after search is performed in a direction of frequency (or time) axis and then proceeds in a direction of time (frequency) axis, the search is continuously performed in the same direction or an opposite direction on the frequency (or time) axis from the same start point (or an opposite start point) as a start point in which the search has been previously performed. For example, in OFDM symbols #0 and #1 of FIG. 21, after search is performed in a direction of frequency axis and proceeds in a direction of time axis, when the search is continuously performed in the same direction from the same start point as the case of the search has been previously performed, an order of searched RE indexes may correspond to '3→0→3→2→1→2→1→2→1→0→3→0→0→3→0→1→2→1→2→1→2→3→0→3'.

As another method, when a specific RE (location) is defined as (k, l) (here, k is a subcarrier index and l is an OFDM symbol index), a rule may be determined with regard to a priority order for RE search for E-REG re-indexing to preferentially perform search from an RE with a lowest 'k+l'. Here, definition of start points (e.g., (0, 0)) of k and l may be set by pre-sharing related information between an eNB and a UE or may be signaled to a UE from an eNB via a higher layer signal or a physical layer signal. For example, when RE search for E-REG re-indexing is performed from an RE with small k in an ascending order, the corresponding method may be interpreted as a method of performing search in a direction of frequency axis. In addition, when RE search for E-REG re-indexing is performed from an RE with small l in an ascending order, the corresponding method may be interpreted as a method of performing search in a direction of time axis.

According to the re-indexing, an operation for uniformly maintaining the number of REs of E-REG can be effectively performed. Similarly, these rules may also be configured to be changed according to a PRB pair index.

<Second Embodiment>

The number of available REs for E-PDCCH transmission varies according to whether the number of symbols used for legacy PDCCH transmission or whether an RS is configured in a specific PRB pair, which causes a problem in that E-CCEs configured from one PRB pair have different number of REs. In order to overcome this problem, the present invention proposes a rule for changing E-CCE indexing according to a PRB pair index.

According to a second embodiment of the present invention, a PRB pair may refer to only PRB pairs present in a frequency resource region that is pre-configured as a search space (SS) of an E-PDCCH. In this case, the E-CCE indexing rule according to the second embodiment of the present invention may not be applied to a PRB pair at another location present on a downlink system band, but not a PRB pair present in a frequency resource region configured as an SS of an E-PDCCH. When frequency resource regions configured as SSs of an E-PDCCH are different between UEs, and an eNB transmits an E-PDCCH to a specific UE, the eNB may apply the second embodiment of the present invention to a corresponding UE with respect to only PRB pairs on a frequency resource region allocated for an SS of an E-PDCCH.

Needless to say, a PRB pair may also refer to a PRB pair present on a downlink system band. When this method is applied, an eNB may apply the second embodiment of the present invention with respect to PRB pairs present in a downlink system band, and a specific UE may recognize an E-CCE indexing rule applied in a PRB pair on a frequency resource region allocated as an SS of an E-PDCCH for the UE in consideration of this operation. According to the second embodiment of the present invention, for convenience of description, it is assumed that a PRB pair refers to only PRB pairs present in a frequency resource region that is pre-configured as an SS of an E-PDCCH.

Like in the second embodiment of the present invention, when an aggregation level N of E-CCE is configured based on a plurality of PRB pairs, lastly generated aggregation level N of E-CCEs are a help to an operation for maintaining the same number of REs. In addition, an E-CCE indexing rule changed according to a PRB pair index may be configured to cell-specifically or may be configured UE-specifically. First, the cell-specifically configuration method may be embodied by pre-sharing the E-CCE indexing rule changed according to a PRB pair index between an eNB and a UE using SIB, PBCH, or RRC/MAC signaling or physical layer signaling, etc. In addition, in the UE-specifically configuration method, an eNB can notify a specific UE or a specific UE group of the E-CCE indexing rule changed according to a PRB pair index via higher layer signaling such as UE-specific RRC signaling or physical layer signaling.

Figure 24:
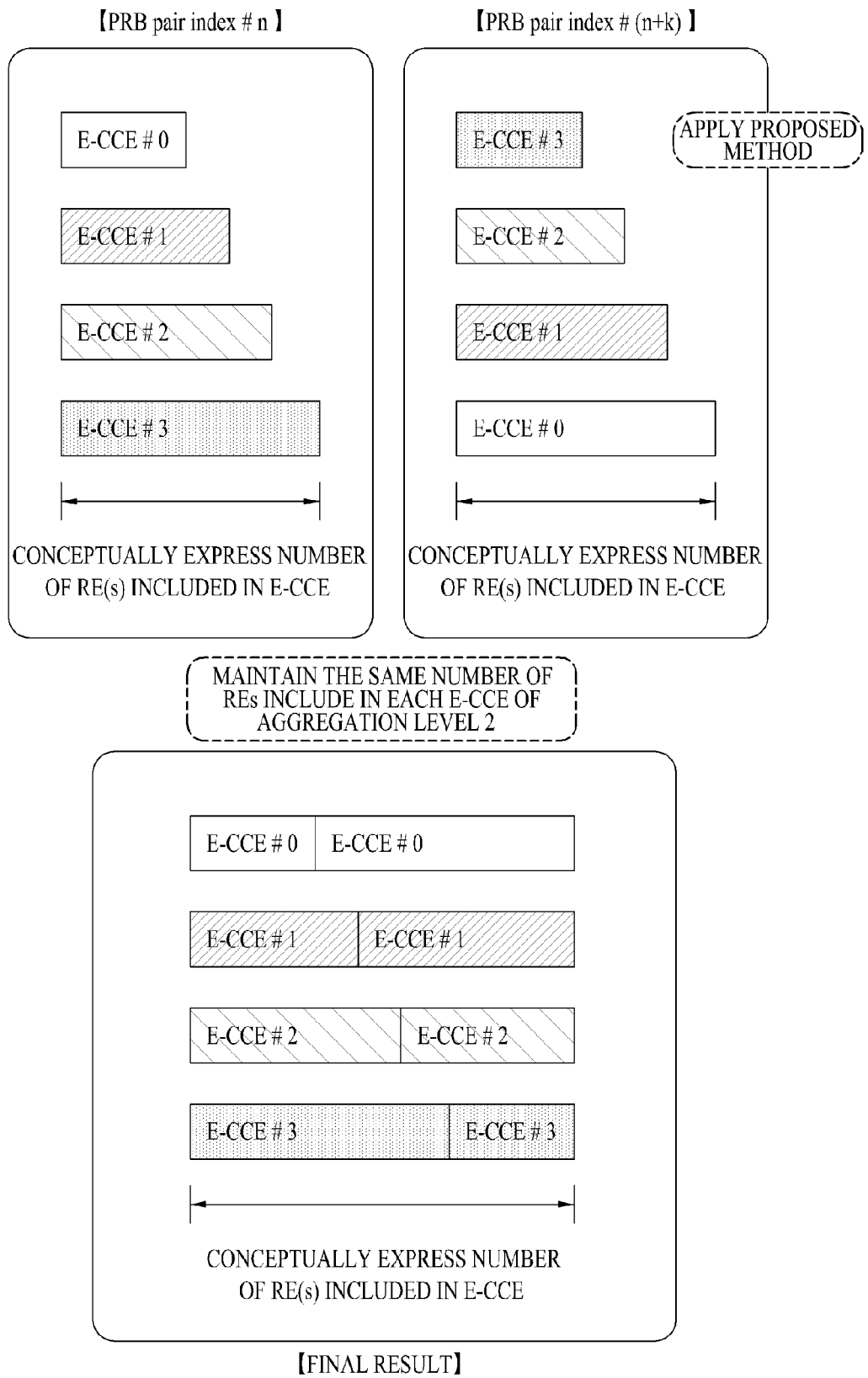
FIG. 24 illustrates an example of a method of changing an E-CCE indexing rule according to a PRB pair index according to the second embodiment of the present invention.

FIG. 24 illustrates an example of a method of changing an E-CCE indexing rule according to a PRB pair index according to the second embodiment of the present invention. In particular, FIG. 24 assumes an E-PDCCH transmitted to a specific UE includes aggregation level 2, that is, 2 E-CCEs and the corresponding two E-CCEs are formed as two, preferably, the same index of E-CCEs extracted from different PRB pairs. In addition, in FIG. 24, a PRB pair refers to PRB pairs present on a frequency resource region that is pre-configured as an SS of an E-PDCCH. In addition, it is assumed that the number of E-CCEs that can be configured from a specific PRB pair and that the same length of E-CCEs, that is, E-CCEs having the same number of included REs include REs (or E-REGs) at equivalent locations in terms of a PRB pair region.

As seen from FIG. 24, when the second embodiment of the present invention is applied, lastly generated aggregation level 2 of E-CCEs include the same number of REs.

In addition, the second embodiment of the present invention also proposes a method of changing E-REG indexing method according to a PRB pair index. This method is a help to an operation for maintaining the number of REs of an E-REG (or the number of REs included in aggregation level N of E-CCE) irrespective of whether the number of symbols used for legacy PDCCH transmission or whether an RS is configured when an E-PDCCH transmitted to a specific UE is configured based on a predetermined number of (e.g., two or more) PRB pairs.

Here, the E-REG indexing method changed according to a PRB pair index may be configured cell-specifically or may be configured UE-specifically, that is, may be independently or differently configured for each UE. First, the cell-specifically configuration method may be embodied by pre-sharing the E-CCE indexing rule changed according to a PRB pair index between an eNB and a UE using SIB, PBCH, or RRC/MAC signaling, etc. In addition, the cell-specifically configuration method may be embodied by pre-sharing the E-CCE indexing rule changed according to a PRB pair index between an eNB and a UE using SIB, PBCH, or RRC/MAC signaling.

In detail, when E-REG indexing for an RE at a specific location is mapped to k in PRB pair #n, E-REG indexing for an RE at a corresponding location may be embodied in the form of (k+1) modulo (the total number of E-REG indexes present in one PRB pair region) in PRB pair #(n+1). Alternatively, the E-REG indexing for the RE at the corresponding location may be embodied in the form of (k+1) modulo (the total number of E-REGs included in one E-CCE) or in the form of (k+1) modulo (the total number of antenna ports used for predetermined specific RS transmission). Here, the RE at the corresponding location refers to an RE at an equivalent location in terms of a predetermined number of PRB pair regions.

The above method can be applied to the case in which REs included in a specific PRB pair or REs used for E-PDCCH transmission, obtained by excluding REs used for legacy PDCCH transmission and REs used for RS transmission, are mapped to N predetermined E-REG indexes. Here, E-REGs may be used to configure aggregation level N of E-CCE in a distributed or localized form.

Figure 25:
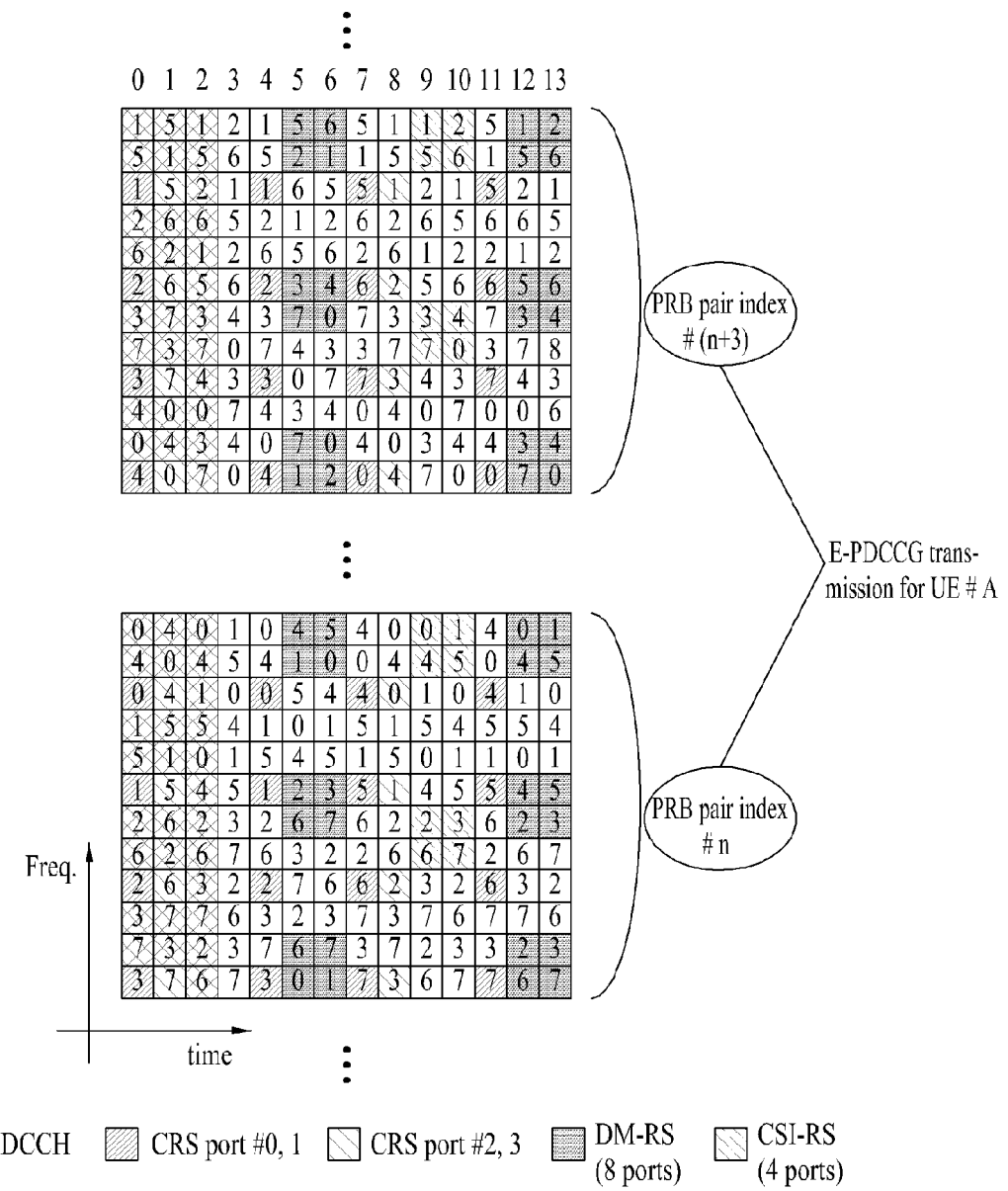
FIG. 25 illustrates an example of changing an E-REG indexing method according to a PRB pair index according to the second embodiment of the present invention.

FIG. 25 illustrates an example of changing an E-REG indexing method according to a PRB pair index according to the second embodiment of the present invention. In particular, FIG. 25 assumes a situation in which a CP length is a normal CP, the number of CSI-RS antenna ports is configured as 8, the number of DM-RS antenna ports is configured as 8, and the number of CRS antenna ports is configured as 4. In addition, it is assumed that the number of symbols used for legacy PDCCH transmission in one subframe is 3 and that an E-PDCCH transmitted to UE #A is transmitted based on two PRB pairs at a predetermined location. In FIG. 25, a PRB pair refers to PRB pairs present on a frequency resource region that is pre-configured as an SS of an E-PDCCH.

In addition, FIG. 25 assumes a situation in which, when E-REG indexing for an RE at a specific location is mapped to k in PRB pair #n, E-REG indexing for an RE at a corresponding location is embodied as ((k+1) modulo (the total number of E-REG indexes present in one PRB pair region) in PRB pair #(n+1). Here, the total number of the E-REG indexes present in one PRB pair region is 8 (i.e., E-REG #0 to E-REG #7). In addition, FIG. 25 assumes that a cyclic shifting offset value is configured as 1 (subcarrier) between OFDM symbols 5 and 6 and OFDM symbols 12 and 13 in which a DM-RS is transmitted in order to equally distribute DM-RS REs for (8) respective E-REGs when the number of DM-RS antenna ports is configured as 8.

As seen from FIG. 25, according to the second embodiment of the present invention, the numbers of REs included in corresponding E-REGs for respective E-REG indexes, obtained by excluding REs used for legacy PDCCH transmission and REs used for RS transmission, are the same. Thus, when an E-PDCCH transmitted to UE #A is transmitted to aggregation level N of E-CCE and one E-CCE includes M pre-configured E-REGs, the number of REs included in the aggregation level N of E-CCE is maintained constant.

Needless to say, the numbers of REs for respective E-REGs may be equally configured in a specific PRB pair, and the numbers of REs for respective E-REGs may not be the same in another PRB pair. If this phenomenon occurs when a scope of a PRB pair is defined as a PRB pair present on a downlink system band, an eNB can use only a PRB pair having the same number of REs for respective E-REGs, for configuration of an SS of an E-PDCCH for specific UEs.

An additional proposed method is a method of changing an E-REG indexing method according to change in a PRB pair index. When an E-PDCCH is configured based on a predetermined number of PRB pairs, the proposed method is a help to an operation for maintaining the number of REs of an E-REG (or the number of REs included in aggregation level N of E-CCE) irrespective of whether an RS is configured or whether the number of symbols used for legacy PDCCH transmission. As described above, a PRB pair may refer to only PRB pairs present on a frequency resource region that is pre-configured as an SS of an E-PDCCH or a PRB pair present on a downlink system band. Here, an eNB may apply a method of changing an E-REG indexing method according to change in PRB pair index only to corresponding PRB pairs, according to a scope of a pre-defined PRB pair.

Meanwhile, in a situation in which an RE indexing method for an E-REG configuration in a symbol in which an RS RE is present is also applied in the same way to a symbol in which an RS RE is not present, an E-REG indexing rule for specific RS configuration REs may be configured to be changed according to a PRB pair index. Here, only REs that reuse an E-REG indexing method for specific RS configuration REs (or REs, E-REG indexing of which needs to be changed together, in order to change E-REG indexing of specific RS configuration REs) and corresponding REs may be affected by a PRB pair index and an E-REG indexing method for the remaining REs may be configured irrespective of change in PRB pair index.

Figure 26:
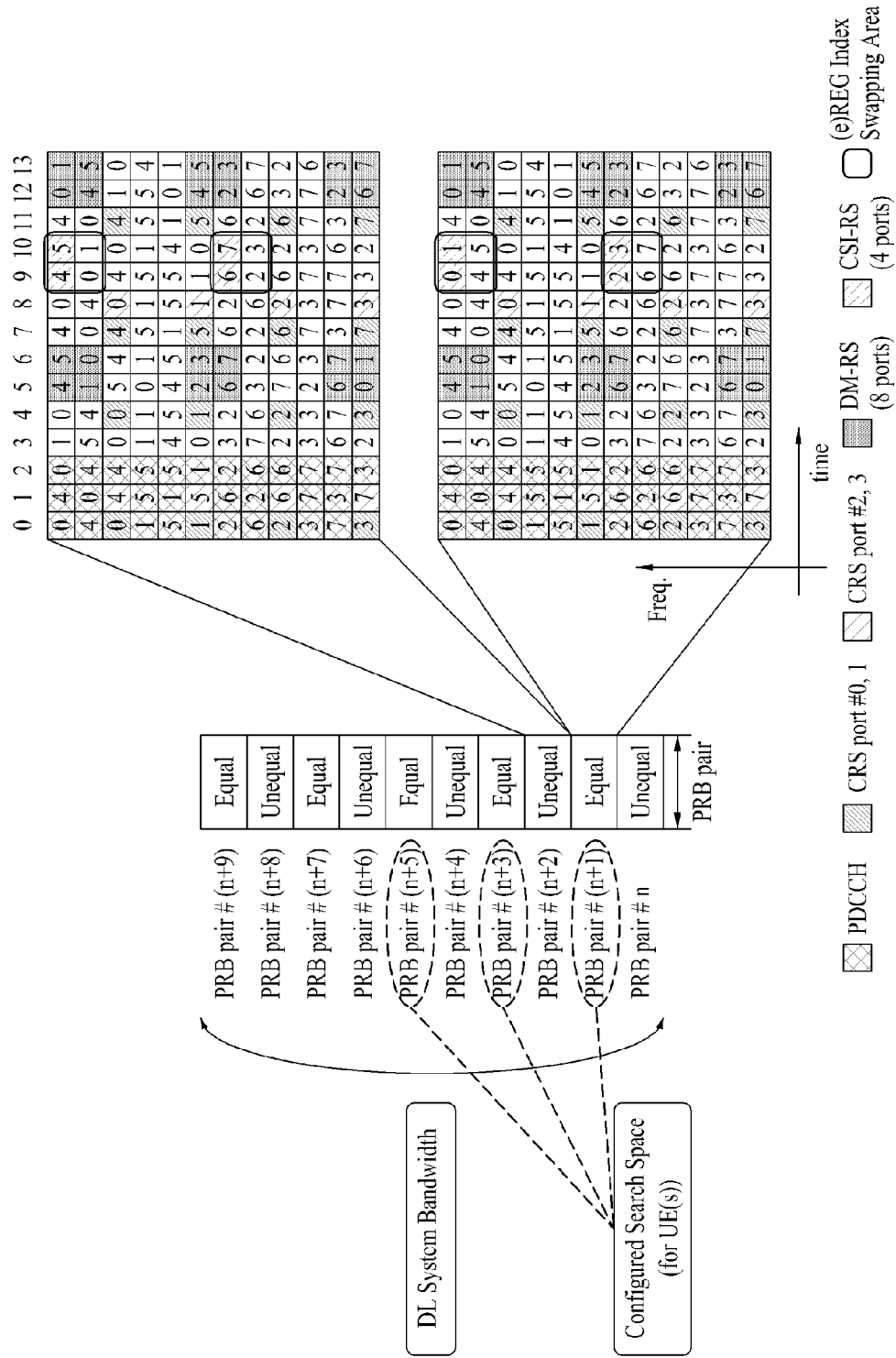
FIG. 26 illustrates another example of changing an E-REG indexing rule according to a PRB pair index according to the second embodiment of the present invention.

FIG. 26 illustrates another example of changing an E-REG indexing rule according to a PRB pair index according to the second embodiment of the present invention. In particular, FIG. 26 assumes that a CP length is a normal CP and the number of OFDM symbols used for legacy PDCCH transmission in one subframe is 3. In addition, it is assumed that the number of CSI-RS antenna ports is 4, the number of DM-RS antenna ports is 8, the number of CRS antenna ports is 4, and the type of E-REG includes 8 of total E-REGs (i.e., E-REG #0 to E-REG #7).

In addition, FIG. 26 assumes a rule of defining a scope of PRB pairs as a PRB pair present on a downlink system band and of swapping of E-REG indexing for CSI-RS REs according to change in PRB pair index with E-REG indexing for REs at a specific location (e.g., a lower location of CSI-RS REs).

As seen from FIG. 26, E-REG indexing for a CSI-RS RE is [0 1] and [2 3] in PRB pair #(n+1), but the E-REG indexing is swapped with E-REG indexing of REs located below (CSI-RS REs) and thus is [4 5] and [6 7] in PRB pair #(n+2). In addition, as seen from FIG. 26, an eNB uses PRB pairs (i.e., PRB pair #(n+1), PRB pair #(n+3), and PRB pair #(n+5)) with the same number of REs for respective E-REGs for configuration of an SS of an E-PDCCH for a specific UE. For reference, in FIG. 26, PRB pairs with the same number of REs for respective E-REGs is indicated by 'Equal' and PRB pairs with different numbers of REs for respective E-REGs is indicated by 'Unequal'.

<Third Embodiment>

When a resource region configured for E-PDCCH transmission is divided into a predetermined number of E-CCEs, a method for pre-fixing locations of REs for respective E-CCEs causes a difference between REs included in the respective E-CCEs according to whether a specific RS or a legacy PDCCH is transmitted. In order to overcome this problem, a rule may be determined in such a way that a resource region configured for E-PDCCH transmission is divided into sub-resources of a least common multiple of a predetermined number of candidate E-CCEs or a predefined specific number of sub-resources along a frequency or time axis and then a combination of sub-resources included in one specific E-CCE is changed according to change in E-CCE number configuration. Here, the sub-resource may be interpreted as a kind of E-REG.

That is, the number and locations of sub-resources included in one specific E-CCE are dynamically changed based on a predetermined rule according to change in E-CCE number configuration. Here, the E-CCE number configuration may be changed according to change in the number of REs used for RS or legacy PDCCH transmission (or change in the number of valid REs that can be used for E-CCE configuration). For example, as the number of REs used for RS or legacy PDCCH transmission is increased, the number of configured E-CCEs may be reduced. In addition, according to the proposed method, a number difference between REs included in respective E-CCEs due to change in RS or legacy PDCCH transmission can be minimized.

FIG. 27 illustrates an example of configuration of sub-resources in one PRB pair region configured for E-PDCCH transmission according to a third embodiment of the present invention.

In particular, FIG. 27(a) assumes a situation in which a CP length is a normal CP, the number of CSI-RSs of 8 antenna port is configured as 1, the number of DM-RSs of 8 antenna port is configured as 1, the number of CRSs of 4 antenna port is configured as 1, and the number of OFDM symbols used for legacy PDCCH transmission is configured as 2. In addition, FIG. 27(b) assumes a situation in which a CP length is a normal CP, the number of CSI-RSs of 8 antenna port is configured as 2, the number of DM-RSs of 8 antenna port is configured as 1, the number of CRSs of 4 antenna port is configured as 1, and the number of OFDM symbols used for legacy PDCCH transmission is configured as 2. In addition, FIG. 27(c) assumes a case in which the number of DM-RSs of 8 antenna port is configured as 1 and an OFDM symbol used for legacy PDCCH transmission is not configured, and for example, an extension carrier or a new type carrier (NCT) is carrier-aggregated in an environment in which a carrier aggregation scheme is applied. In addition, one PRB pair region is divided into sub-resources, the number of which is 12 as a least common multiple of the number of candidate E-CCEs along a frequency axis (i.e., in units of subcarriers).

Accordingly, FIG. 27(a) assumes that E-CCE number configuration is 2, FIG. 27(b) assumes that E-CCE number configuration is 3, and FIG. 27(c) assumes that E-CCE number configuration is 4. In addition, as seen from FIG. 27, the numbers of REs included in the respective E-CCEs of FIG. 27(a) are the same as 44 RE, the numbers of REs included in the respective E-CCEs of FIG. 27(b) are the same as 32 RE, and the numbers of REs included in 4 E-CCEs of FIG. 27(c) are divided into 34, 38, 38, and 34, respectively. That is, according to the third embodiment of the present invention, a number difference between REs included in respective E-CCEs due to change in RS or legacy PDCCH transmission can be minimized.

<Fourth Embodiment>

A fourth embodiment of the present invention proposes an allocation scheme based on frequency divisional multiplexing (FDM) in order to simplify a mapping method when one PRB pair is divided into four E-REGs or E-CCEs. Here, E-REG indexing may be performed based on a predefined frequency priority mapping method or time priority mapping method in each part divided in an FDM scheme (or in one PRB pair). Here, a valid RE for actual E-PDCCH allocation in a PRB pair includes REs obtained by excluding a legacy PDCCH RE, a CRS RE, a UE-specific RS RE, a CSI-RS RE, etc.

Figure 28:
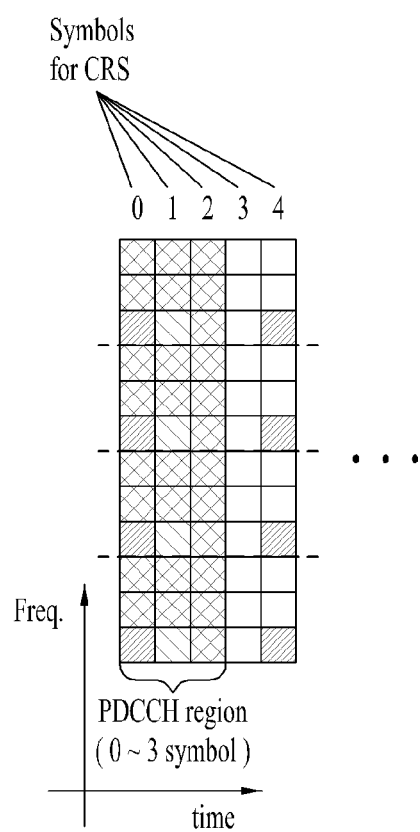
FIG. 28 illustrates a method of FDM and dividing a symbol, to which a PDCCH region and a CRS are allocated, into four parts according to a fourth embodiment of the present invention.

FIG. 28 illustrates a method of FDM and dividing a symbol, to which a PDCCH region and a CRS are allocated, into four parts according to the fourth embodiment of the present invention.

Referring to FIG. 28, assuming that a PRB pair is divided via a FDM scheme, a PDCCH RE, a CRS RE, etc. may be accurately divided into four components. That is, 12 REs belonging to one symbol are entirely removed from a PDCCH symbol, and thus, the symbol is equally divided into three REs per part. In addition, locations of CRSs are determined by a cell-specific offset (v-shift) value in a symbol in which a CRS is mapped. However, only one RE is also removed in each part for each symbol, and thus the symbol may also be equally divided.

Figure 29:
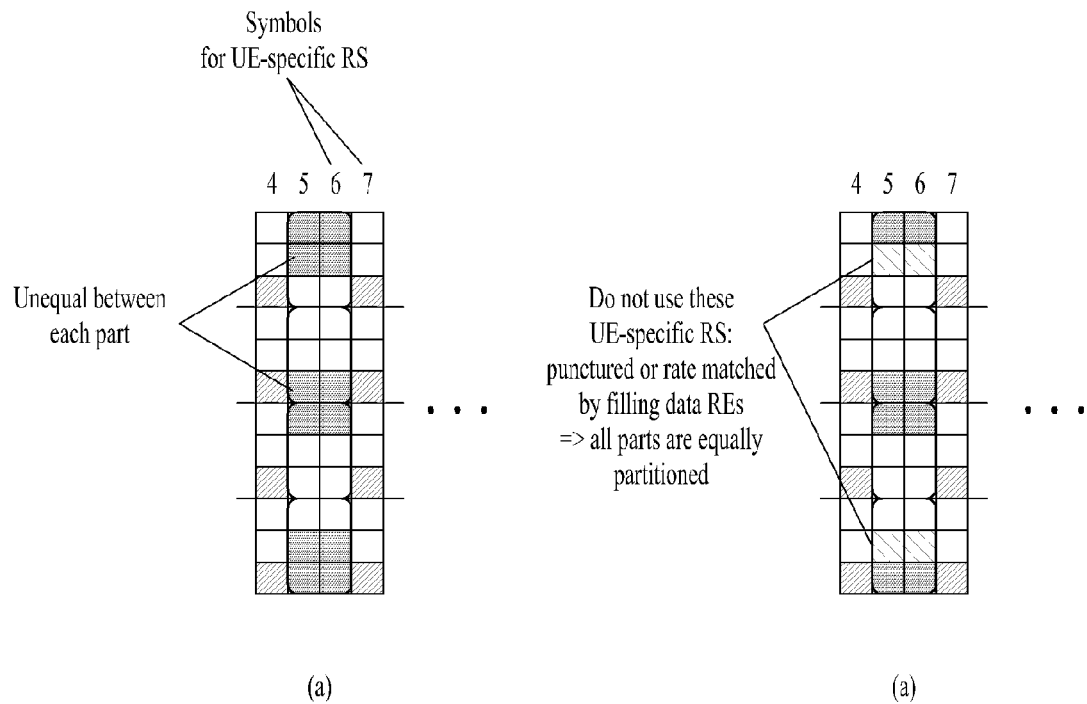
FIGS. 29 and 30 illustrates a method of FDM and dividing a symbol, to which a UE-specific RS is allocated, into four parts according to the fourth embodiment of the present invention.
Figure 30:
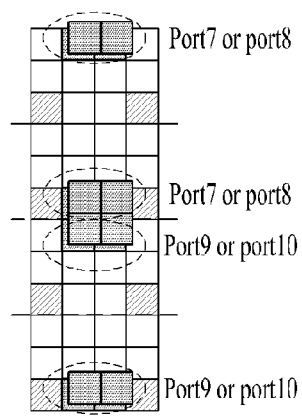

FIGS. 29 and 30 illustrates a method of FDM and dividing a symbol, to which a UE-specific RS is allocated, into four parts according to the fourth embodiment of the present invention.

Referring to FIG. 29, one PRB pair cannot be divided into four parts while maintaining orthogonality using a UE-specific RS structure using only antenna ports #7 and #8. Needless to say, although a scrambling identifier (SCID), etc. can be used, complete orthogonality between antenna ports is not achieved. In addition, although one PRB pair can be divided into four parts using a UE-specific RS structure in the form of 24 RE using antenna ports #7 to #10, four REs are removed in first and fourth parts and two REs are removed in second and third parts like in FIG. 29(a), an equal form cannot be achieved.

In this case, when REs to which a UE-specific RS is allocated are changed like in FIG. 29(b), the number of REs for each part may be equally divided. That is, the number of UE-specific RSs corresponding to first and fourth parts are halved without changing UE-specific RSs corresponding to second and third parts, and for example, REs in which a corresponding RS is transmitted are punctured or transmission power of REs in which the corresponding RS is transmitted is configured as 0, and thus, the number of UE-specific RSs for each PRB pair is reduced to 16 RE.

As such, the number of REs corresponding to each part can be equally divided, and four antenna ports can be selectively used so as to maintain orthogonality between the antenna ports like in FIG. 30. A set of antenna ports that can be selected in first and second parts may be {7, 8} or {8, 7} and a set of antenna ports that can be selected in third and fourth parts may be {9, 10} or {10, 9}. In this regard, four antenna ports can be allocated simply by using only 16 RE overhead for a UE-specific RS without using 24 RE overhead.

In this case, REs that are not used as a UE-specific RS may be rate-matched and used as a data RE or may be punctured and used for power boosting of an RS. In addition, whether REs that are not used as a UE-specific RS are reused for a specific purpose, for example, for a PDSCH, are defined to allocate power of 0, are configured to maintain a puncturing state, or are used as null, etc. may be implicitly assumed based on a predefined rule or corresponding information may be signaled to a UE from an eNB via predefined signaling.

In addition, FIG. 30 is advantageous in that CDM between a legacy UE using a legacy DM-RS structure and an advanced UE using a modified DM-RS structure, antenna port-based multiplexing, or beamforming-based multiplexing can be effectively performed. That is, the method illustrated in FIG. 30 may be interpreted as a method for simply reducing DM-RS overhead while maintaining a mapping correlation between an antenna port and REs in which a DM-RS as a legacy UE-specific RS is transmitted.

Figure 31:
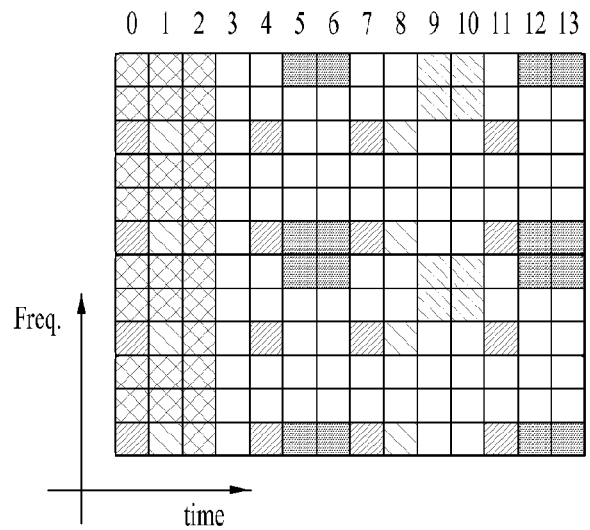
FIG. 31 illustrates a method of FDM and dividing a specific PRB pair into four parts according to the fourth embodiment of the present invention.

FIG. 31 illustrates a method of FDM and dividing a specific PRB pair into four parts according to the fourth embodiment of the present invention. In particular, FIG. 31 assumes that the aforementioned modified form of UE-specific RS is included.

Referring to FIG. 31, a specific PRB pair may be divided into four E-REGs or E-CCEs having the equal number of REs. Needless to say, this can also be extensively applied to the case in which one PRB pair is divided into a plurality of predefined E-REGs (e.g., 16 E-REGs) or E-CCEs (e.g., 2 E-CCE or 4 E-CCE).

Furthermore, the mapping correlation between an antenna port and REs in which a modified type of UE-specific RS of FIG. 29(a) and FIG. 30 is transmitted can be changed. For example, a location of the modified form of the UE-specific RS of FIG. 30 may be maintained, and a mapping correlation between an antenna port and REs in which a UE-specific RS is transmitted may be changed in second and third parts only.

Figure 32:
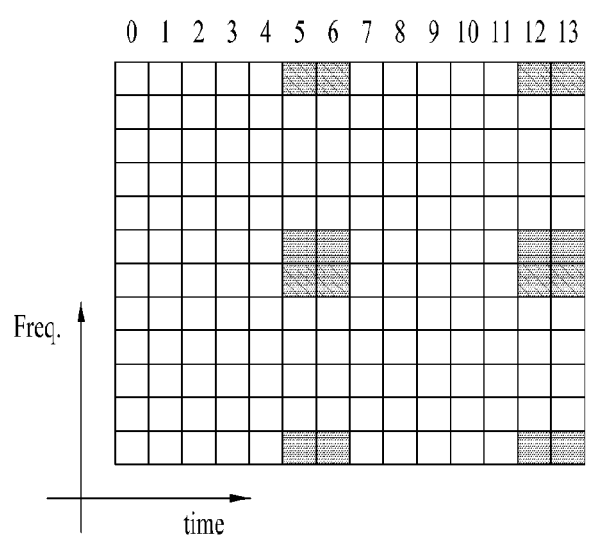
FIG. 32 illustrates an example of changing a mapping correlation between an antenna ports and REs in which a UE-specific RS is transmitted according to the fourth embodiment of the present invention.

FIG. 32 illustrates an example of changing a mapping correlation between an antenna ports and REs in which a UE-specific RS is transmitted according to the fourth embodiment of the present invention. In particular, FIG. 32 assumes a case in which the mapping correlation is changed in second and third parts only.

Comparing FIGS. 30 and 32, it can be seen that antenna ports #7 and #8 are configured in REs used for UE-specific RS transmission in a second part in FIG. 30 but are changed to antenna ports #9 and #10 in FIG. 32. In addition, it can be seen that antenna ports #9 and #10 are configured in REs used for UE-specific RS transmission in a third part in FIG. 30 but are changed to antenna ports #7 and #8 in FIG. 32. This change may be interpreted as swapping of a mapping correlation between an antenna port and REs in which a UE-specific RS of second and third parts is transmitted.

FIGS. 30 and 32 can be used to reduce overhead of a UE-specific RS (e.g., to reduce DM-RS overhead of 24 RE to 16 RE while maintaining the number (i.e., 4) of antenna ports) as well as to overcome an inequality problem in the number of available REs for E-PDCCH transmission between different E-REGs (or E-CCE) indexes. Here, an operation for reducing UE-specific RS overhead may be required due to reasons 1) and 2) below.

1) Many cells (hereinafter, referred to as a small cell for convenience of description) having a relatively small communication coverage may be installed by a network operator or each consumer for more enhanced quality of communications in a future network. Under this environment, a distance between a small cell and a UE that communicates with the corresponding small cell may be small due to a relatively small communication coverage (or a relatively small value of maximum transmission power) of the small cell. In addition, possibility of a strong line-of-sight (LOS) component is high in a channel between the small cell and a UE due to a small distance therebetween, which may be interpreted as if a channel state between the small cell and the UE is not seriously changed. Accordingly, under this environment, a method for further reducing overhead of an RS used for channel estimation (or interference estimation) may be considered. Here, a representative example of an RS used for channel estimation (or interference estimation) may be a UE-specific RS.

2) The number of available REs for E-PDCCH transmission is insufficient in a specific subframe type, and thus corresponding E-PDCCH transmission may not be performed. Here, when a CP length is a normal CP, if special subframe configuration #0 and #5 based special subframes and a CP length are an extended CP, special subframe configuration #0, #4, and #7 based on special subframes may be configured in a subframe type in which the aforementioned E-PDCCH transmission is not transmitted. However, transmission of a CRS (or a TRS) used for PDCCH decoding of NCT is performed at a predetermined period but not every subframe, and thus PDCCH transmission may not be ensured at each subframe point of time or a PDCCH may not be embodied in corresponding NCT. Accordingly, E-PDCCH transmission needs to be ensured irrespective of a subframe type in an NCT cell. Here, due to the insufficient number of available REs for E-PDCCH transmission, E-PDCCH transmission needs to be also ensured in a subframe type (e.g., special subframe configuration #0 and #5 in the case of normal CP, and special subframe configuration #0, #4, and #7 in the case of extended CP) that is configured so as not to perform E-PDCCH transmission. However, in the corresponding subframe type, since the number of REs used for E-PDCCH transmission or PDSCH transmission is not sufficient, methods for reducing overhead of a UE-specific RS used for decoding of the corresponding E-PDCCH or decoding of a PDSCH may be additionally considered.

Overhead of a UE-specific RS such as a DM-RS used for channel estimation or interference estimation may be reduced by puncturing REs in which the corresponding UE-specific RS is transmitted or by configuring transmission power of REs in which the corresponding UE-specific RS is transmitted, as 0.

Information about reused use of REs that are not used for corresponding UE-specific RS transmission when being reused due to application of the operation for reducing overhead may be recognized based on a predefined rule or may be signaled to a UE from an eNB via predefined signaling. Here, an example of the reused use may be configuration for maintaining PDSCH transmission use or a puncturing state, or allocation of transmission power to 0. In addition, the proposed method can be extensively applied to all reference signals used for E-PDCCH decoding and/or PDSCH decoding.

When schemes for reducing overhead of a UE-specific RS used for E-PDCCH decoding or PDSCH decoding are applied like in FIGS. 30 and 32, PRB bundling may be further considered in order to enhance channel estimation performance based on a corresponding UE-specific RS. That is, a channel estimation operation may be performed by bundling UE-specific RSs transmitted on a predefined number (or a bundling unit) of PRB pairs once, thereby enhancing channel estimation performance. When this PRB bundling is applied, UE-specific RSs transmitted on a predefined number (or a bundling unit) of PRB pairs for a more accurate channel estimation operation may be equally distributed as possible.

Figure 33:
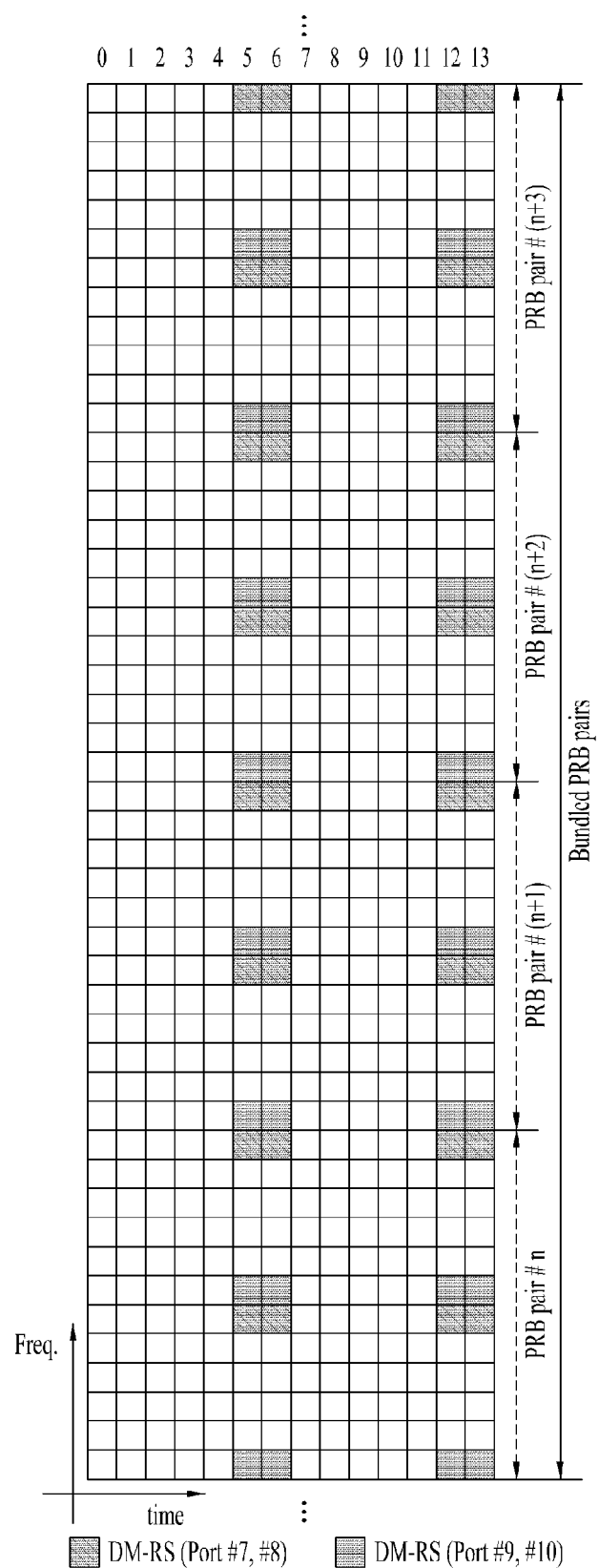
FIG. 33 illustrates an example in which PRB bundling is applied based on the UE-specific RSs of FIG. 32 according to the fourth embodiment of the present invention.

FIG. 33 illustrates an example in which PRB bundling is applied based on the UE-specific RSs of FIG. 32 according to the fourth embodiment of the present invention. As seen from FIG. 33, corresponding modified form of UE-specific RSs are equally distributed on PRB pairs to which a PRB bundling method is applied.

However, when a CSI-RS is allocated, a PRB pair may not be divided via only an FDM method.

Figure 34:
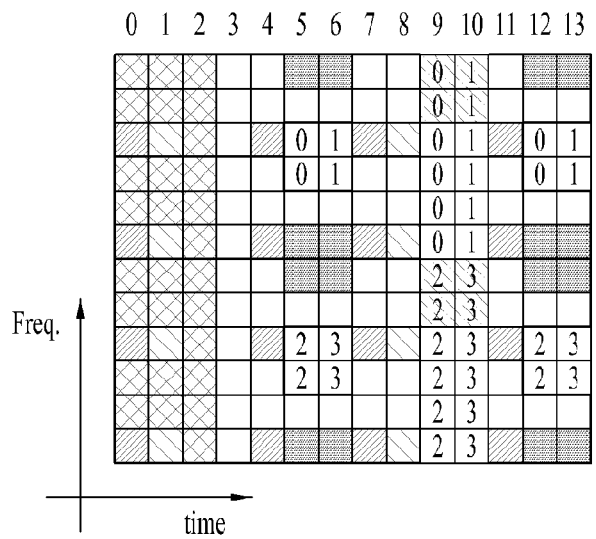
FIG. 34 illustrates a method of FDM and dividing a PRB to which a CSI-RS is allocated, into four parts according to the fourth embodiment of the present invention.

FIG. 34 illustrates a method of FDM and dividing a PRB to which a CSI-RS is allocated, into four parts according to the fourth embodiment of the present invention. In particular, FIG. 34 assumes that 4 antenna port of a CSI-RS is allocated.

As seen from FIG. 34, the aforementioned E-REG/E-CCE configuration methods of FIG. 34 are applied to a symbol (i.e., symbols #5, #6, #9, #10, #12, and #13) in which a CSI-RS is transmitted, and an FDM method is maintained in the remaining regions.

Meanwhile, when RE indexing for an E-REG configuration is performed in a resource region configured for E-PDCCH transmission, a rule may be determined in such a way that RE indexing for E-REG configuration is performed on the remaining REs obtained by excluding REs used for specific RS transmission of a predefined antenna port number (or an antenna port number). Preferably, RE indexing for E-REG configuration may be performed via the aforementioned methods and then RE indexing may be removed with respect to REs used for specific RS transmission of a predefined antenna port number (or an antenna port number).

Here, the REs excluded from the RE indexing for E-REG configuration may be, in particular, DM-RS REs. This is because the number of patterns of DM-RS REs is not greater than other RSs such as a CSI-RS. Here, the port number of a DM-RS may be assumed to be 2 (e.g., 12 RE in a normal subframe as a normal CP) or 4 (or 8) (e.g., 24 RE in a normal subframe of a normal CP).

Figure 35:
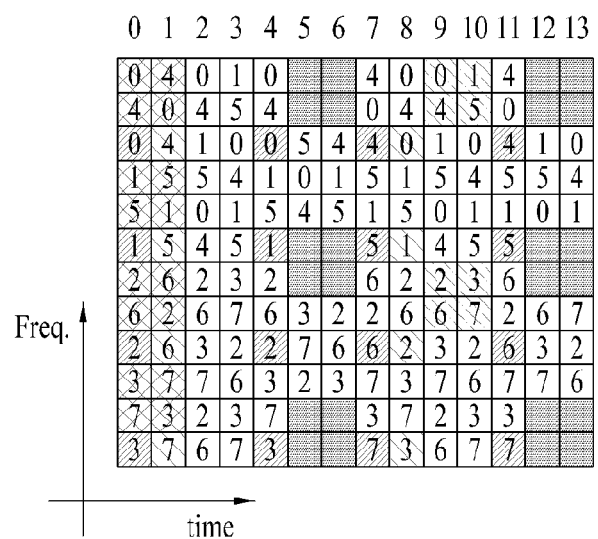
FIGS. 35 to 37 illustrate examples in which RE indexing for E-REG configuration in the same situations as those of FIGS. 17 to 20, respectively according to the fourth embodiment of the present invention.
Figure 36:
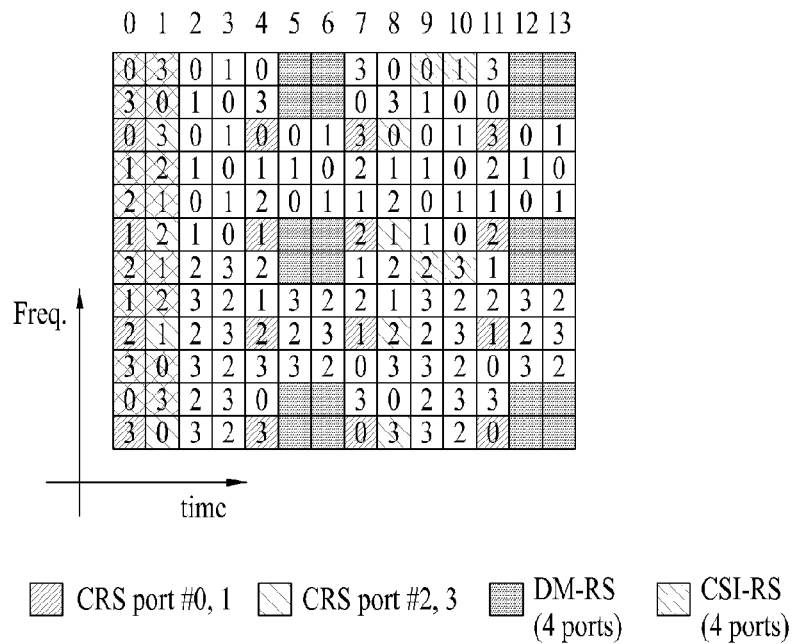
Figure 37:
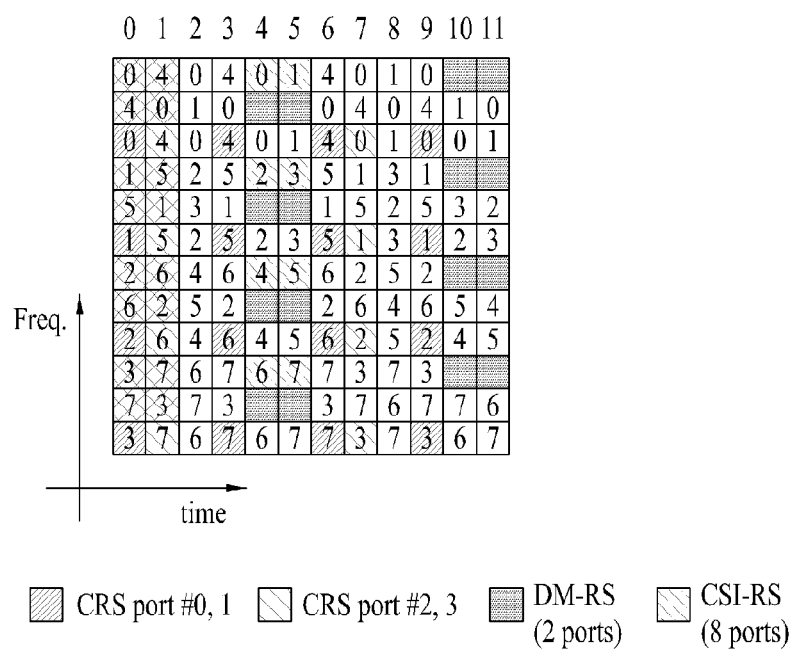

FIGS. 35 to 37 illustrate examples in which RE indexing for E-REG configuration in the same situations as those of FIGS. 17 to 20, respectively according to the fourth embodiment of the present invention.

In particular, FIG. 35 assumes that DM-RS REs of 8 antenna port are excluded from RE indexing for E-REG configuration, FIG. 36 assumes that DM-RS REs of 4 antenna port are excluded from RE indexing for E-REG configuration, and FIG. 37 assumes that DM-RS REs of 2 antenna port are excluded from RE indexing for E-REG configuration. In addition, FIGS. 35 to 37 assume that one PRB pair is divided into 8, 4, and 8 E-REGs, respectively.

<Fifth Embodiment>

In order to equalize the numbers of REs included in respective E-REGs that are affected by reference signal transmission or a legacy PDCCH, RE indexing for E-REG configuration may be embodied based on a predefined rule (e.g., a frequency priority method). Here, the frequency priority method refers to a method of sequentially indexing REs included in an E-REG in a direction of predefined frequency axis. Hereinafter, although it will be assumed that RE indexing for E-REG configuration is embodied via a frequency priority method, it is obvious to extensively apply the present invention to the case in which the RE indexing is performed based on various rules such as a time priority method.

The fifth embodiment of the present invention proposes a method of preferentially selecting specific offset values so as to equalize the number of REs included in respective E-REGs, which are affected by RS transmission or legacy PDCCH, as possible when a cyclic shifting value for each OFDM symbol or an increased value (or a reduced value) of the offset value is configured, in a specific PRB pair used for transmission of an E-PDCCH (as another meaning, a common search space (CSS) or UE-specific search space (USS)).

An offset value or an increased value (or a reduced value) of the offset value may be independently configured based on a predefined resource region unit, such as a time domain unit such as subframe/slot, a frequency domain unit such as a PRB pair, a combination of time/frequency domain units, or the like. In addition, information about the corresponding offset value or configuration of the offset value may be signaled to a UE from an eNB via a predefined physical channel or a higher layer signal.

As another method, in order to achieve a randomization effect of inter-cell interference, a cyclic shifting offset value for each OFDM symbol applied to a specific resource region such as a PRB pair or configuration of an increased value (or a reduced value) of the offset value may be changed in association with a predetermined parameter such as a physical cell ID (PCID), a function having the predetermined parameter as a parameter, a virtual cell ID that is pre-configured for this use, a PRB index (or a subframe index or a slot index), antenna port/scrambling ID configured for specific RS transmission, or the like.

For example, even if E-PDCCH transmission is performed using the same E-REG index between cells, indexes of REs included in the same E-REG index between cells or RE locations are randomly configured based on a predetermined parameter or a function having the predefined parameter as a parameter, thereby achieving an interference randomization effect in the same E-REG index between cells.

Here, a scope of the offset value or increased values (or reduced values) of the offset value, which are changed in associated with the predefined parameter or the function having the predefined parameter as a parameter, may be limited to a candidate set including predefined specific values, and corresponding information may be shared via a physical channel or a higher layer signal, which is predefined between an eNB and a UE or between cells.

In addition, a cyclic shifting offset value for each OFDM symbol or an increased value (or a reduced value) of the offset value may be differently determined according to a subframe type or assumption regarding whether a predefined specific RS is transmitted. Here, an example of the subframe type may include a CP length type, i.e., information about whether the CP length is a normal CP or an extended CP, a DwPTS configuration type in a special subframe, a special subframe configuration type, information regarding whether MBSFN is configured, etc. This is because the number of available REs for E-REG configuration, a difference value between maximum and minimum values of REs included in each E-REG that is affected by specific RS transmission (e.g., CRS and CSI-RS), or a difference value between maximum and minimum values of available REs for each E-REG may be changed according to a subframe type or whether various configurations such as assumption regarding whether a specific RS is transmitted. Furthermore, this is because the number of E-REGs included in a specific resource region such as a PRB pair or an RE indexing rule for E-REG configuration may be changed according to whether the various configuration is applied. For example, the number of DM-RS REs may be differently configured in a special subframe, from a normal subframe.

In detail, as a case in which RE indexing for E-REG configuration is embodied using a priority mapping method, in a situation in which corresponding REs (e.g., 16 RE in the case of extended CP/24RE in the case of normal CP) used for pre-assumed DM-RS transmission are excluded from an RE indexing scope (or an RE scope for counting (or applying) cyclic shifting offset values for each OFDM symbol) for E-REG configuration, when it is assumed that normal CP/CSI-RS of 8 antenna port/CRS of 4 antenna port (or CRS of 2 antenna port) are configured and that a rule for puncturing (or rate matching) corresponding REs is applied and one PRB pair includes 8 E-REGs when locations of CRS RE and CSI-RS RE overlap each other among REs used for E-REG transmission, an increased value (or a reduced value) of a cyclic shifting offset value for equally distributing the number of REs included in each E-REG affected by RS transmission or the number of REs included in each E-REG affected by legacy PDCCH, as possible, may be configured to a specific value of 1 or 7.

Table 4 below shows reasons for preferentially determining an increased value (or an offset value) of a cyclic shifting offset value as a specific value of 1 or 7 based on a difference value between maximum and minimum values of REs included in each E-REG in the case of normal CP. Here, in Table 4 below, Examples #1 and #2 refer to cases in which CSI-RS configuration of 8 antenna port is differently determined.

TABLE 4

| | Offset Value | 0 | 1 | 2 | 3 | 4 | 5 | 6 | 7 | 8 | 9 | 10 | 11 |
|---|---|---|---|---|---|---|---|---|---|---|---|---|---|
| Assume RS transmission | 4 CRS | 2 | 2 | 2 | 2 | 2 | 2 | 2 | 2 | 2 | 2 | 2 | 2 |
| | 2 CRS | 4 | 2 | 2 | 4 | 2 | 2 | 4 | 2 | 2 | 4 | 2 | 2 |
| | 8 CSI-RS (Examples #1) | 0 | 2 | 2 | 2 | 2 | 2 | 0 | 2 | 2 | 2 | 2 | 2 |
| | 8 CSI-RS (Examples #2) | 0 | 2 | 2 | 2 | 2 | 2 | 0 | 2 | 2 | 2 | 2 | 2 |
| | 8 CSI-RS & 4 CRS (Examples #1) | 2 | 2 | 4 | 4 | 2 | 2 | 2 | 2 | 4 | 4 | 2 | 2 |
| | 8 CSI-RS & 4 CRS (Examples #2) | 2 | 2 | 2 | 3 | 2 | 2 | 2 | 2 | 2 | 3 | 2 | 2 |
| | 8 CSI-RS & 2 CRS (Examples #1) | 4 | 2 | 4 | 6 | 2 | 4 | 4 | 2 | 4 | 6 | 2 | 4 |
| | 8 CSI-RS & 2 CRS (Examples #2) | 4 | 2 | 2 | 5 | 3 | 3 | 4 | 2 | 2 | 5 | 3 | 3 |

Figure 38:
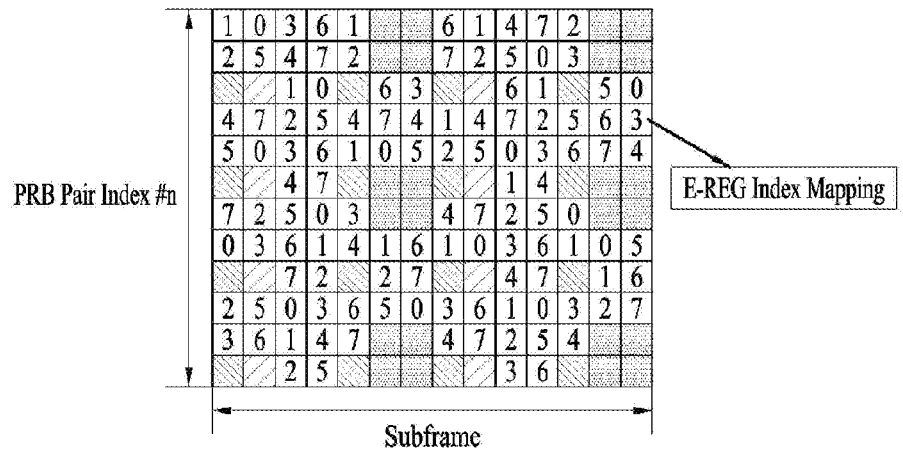
FIGS. 38 and 39 illustrate examples of cases in which increased value of cyclic shifting offset values are configured as 1 and 7, respectively in order to equally distribute the number of REs includes in each E-REG affected by CRS transmission as possible according to the fifth embodiment of the present invention.
Figure 39:
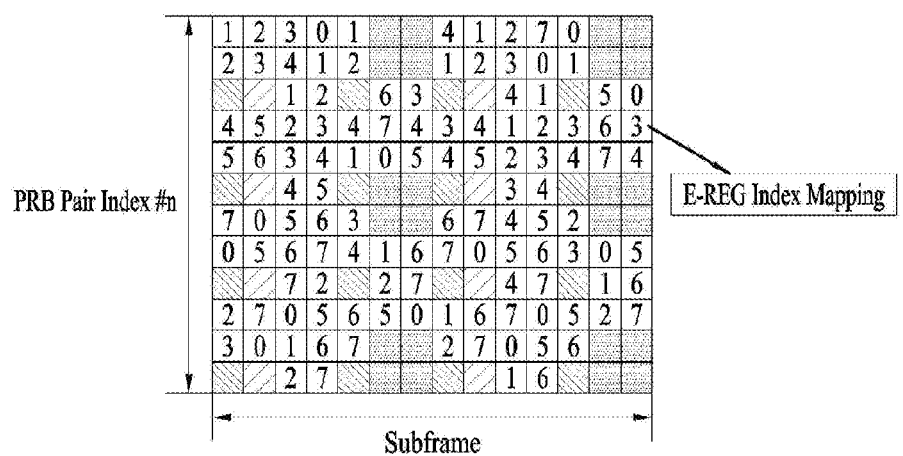

FIGS. 38 and 39 illustrate examples of cases in which increased value of cyclic shifting offset values are configured as 1 and 7, respectively in order to equally distribute the number of REs includes in each E-REG affected by CRS transmission as possible according to the fifth embodiment of the present invention.

Here, FIGS. 38 and 39 assumes a situation in which 24 REs used in DM-RS transmission of 8 antenna port are excluded from an RE indexing scope (or an RE scope for counting (or applying) a cyclic shifting offset value for each OFDM symbol) for E-REG configuration. In addition, it is assumed that, in the case of normal CP, when location of REs overlap locations of CRS REs among REs used for transmission of 4 antenna port CRS/E-REG, a rule for puncturing (or rate matching) the corresponding REs is applied/one PRB pair includes 8 E-REGs, and RE indexing for E-REG configuration is embodied using a frequency priority mapping method.

As seen from FIGS. 38 and 39, difference values between maximum and minimum values of REs included in each E-REG affected by 4 antenna port CRS transmission are the same, that is, 2.

As another example in which RE indexing for E-REG configuration is embodied using a frequency priority mapping method, when only a CP length is applied as an extended CP under the aforementioned assumption, an increased value (or an offset value) of a cyclic shifting offset value for equalizing the number of REs included in each E-REG affected by RS transmission or the number of REs included in each E-REG affected by legacy PDCCH as possible may be selected as a specific value of 1, 3, 5, 7, 9, or 11.

Table 5 below shows reasons for preferentially determining an increased value (or an offset value) of a cyclic shifting offset value as a specific value of 1, 3, 5, 7, 9, or 11 based on a difference value between maximum and minimum values of REs included in each E-REG in the case of extended CP. Here, in Table 5 below, Examples #1 and #2 also refer to cases in which CSI-RS configuration of 8 antenna port is differently determined.

TABLE 5

| | Offset Value | 0 | 1 | 2 | 3 | 4 | 5 | 6 | 7 | 8 | 9 | 10 | 11 |
|---|---|---|---|---|---|---|---|---|---|---|---|---|---|
| Assume RS transmission | 4 CRS | 2 | 2 | 2 | 2 | 2 | 2 | 2 | 2 | 2 | 2 | 2 | 2 |
| | 2 CRS | 0 | 0 | 0 | 0 | 0 | 0 | 0 | 0 | 0 | 0 | 0 | 0 |
| | 8 CSI-RS (Examples #1) | 2 | 0 | 2 | 0 | 2 | 0 | 2 | 0 | 2 | 0 | 2 | 0 |
| | 8 CSI-RS (Examples #2) | 2 | 0 | 2 | 0 | 2 | 0 | 2 | 0 | 2 | 0 | 2 | 0 |
| | 8 CSI-RS & 4 CRS (Examples #1) | 4 | 2 | 4 | 2 | 4 | 2 | 4 | 2 | 4 | 2 | 4 | 2 |
| | 8 CSI-RS & 4 CRS (Examples #2) | 4 | 2 | 4 | 2 | 4 | 2 | 4 | 2 | 4 | 2 | 4 | 2 |
| | 8 CSI-RS & 2 CRS (Examples #1) | 2 | 0 | 2 | 0 | 2 | 0 | 2 | 0 | 2 | 0 | 2 | 0 |
| | 8 CSI-RS & 2 CRS (Examples #2) | 2 | 0 | 2 | 0 | 2 | 0 | 2 | 0 | 2 | 0 | 2 | 0 |

As another example in which RE indexing for E-REG configuration is embodied using a frequency priority mapping method, under the same assumption for the remaining configurations as the example of Table 4 above (i.e., the case of normal CP/the case in which one PRB pair includes 8 E-REGs) except for the assumption in that one PRB pair includes 16 E-REGs, an increased value (or an offset value) of a cyclic shifting offset value for equalizing the number of REs included in each E-REG affected by RS or legacy PDCCH as possible may be selected as a specific value of 4, 6, or 10 (or 0).

Table 6 below shows reasons for preferentially determining an increased value (or an offset value) of a cyclic shifting offset value as a specific value of 4, 6, or 10 (or 0) based on a difference value between maximum and minimum values of REs included in each E-REG. Here, in Table 6 below, Examples #1 and #2 also refer to cases in which CSI-RS configuration of 8 antenna port is differently determined.

TABLE 6

| | Offset Value | 0 | 1 | 2 | 3 | 4 | 5 | 6 | 7 | 8 | 9 | 10 | 11 |
|---|---|---|---|---|---|---|---|---|---|---|---|---|---|
| Assume RS transmission | 4 CRS | 1 | 1 | 3 | 1 | 1 | 3 | 1 | 1 | 3 | 1 | 1 | 3 |
| | 2 CRS | 2 | 2 | 2 | 2 | 2 | 2 | 2 | 2 | 2 | 2 | 2 | 2 |

TABLE 6-continued

| Offset Value | 0 | 1 | 2 | 3 | 4 | 5 | 6 | 7 | 8 | 9 | 10 | 11 |
|---|---|---|---|---|---|---|---|---|---|---|---|---|
| 8 CSI-RS (Examples #1) | 1 | 2 | 2 | 2 | 1 | 1 | 1 | 2 | 2 | 2 | 1 | 1 |
| 8 CSI-RS (Examples #2) | 1 | 1 | 1 | 1 | 1 | 1 | 1 | 1 | 1 | 1 | 1 | 1 |
| 8 CSI-RS & 4 CRS (Examples #1) | 2 | 3 | 3 | 3 | 2 | 3 | 2 | 3 | 3 | 3 | 2 | 3 |
| 8 CSI-RS & 4 CRS (Examples #2) | 2 | 2 | 4 | 2 | 2 | 4 | 2 | 2 | 4 | 2 | 2 | 4 |
| 8 CSI-RS & 2 CRS (Examples #1) | 3 | 3 | 3 | 4 | 3 | 3 | 3 | 3 | 3 | 4 | 3 | 3 |
| 8 CSI-RS & 2 CRS (Examples #2) | 3 | 3 | 3 | 3 | 3 | 3 | 3 | 3 | 3 | 3 | 3 | 3 |

Lastly, under the same assumption for the remaining configurations as the example of Table 5 above (i.e., the case of extended CP/the case in which one PRB pair includes 8 E-REGs) except for the assumption in that a PRB pair includes (is divided into) 16 E-REGs, an increased value (or an offset value) of a cyclic shifting offset value for equalizing the number of REs included in each E-REG affected by RS or legacy PDCCH as possible may be selected as a specific value of 3, 6, or 9 (or 0).

Table 7 below shows reasons for preferentially determining an increased value (or an offset value) of a cyclic shifting offset value as a specific value of 3, 6, or 9 (or 0) based on a difference value between maximum and minimum values of REs included in each E-REG. Here, in Table 7 below, Examples #1 and #2 refer to cases in which CSI-RS configuration of 8 antenna port is differently determined.

TABLE 7

| | Offset Value | 0 | 1 | 2 | 3 | 4 | 5 | 6 | 7 | 8 | 9 | 10 | 11 |
|---|---|---|---|---|---|---|---|---|---|---|---|---|---|
| Assume RS transmission | 4 CRS | 2 | 4 | 4 | 2 | 4 | 4 | 2 | 4 | 4 | 2 | 4 | 4 |
| | 2 CRS | 2 | 2 | 2 | 2 | 2 | 2 | 2 | 2 | 2 | 2 | 2 | 2 |
| | 8 CSI-RS (Examples #1) | 1 | 1 | 1 | 1 | 1 | 1 | 1 | 1 | 1 | 1 | 1 | 1 |
| | 8 CSI-RS (Examples #2) | 1 | 1 | 1 | 1 | 1 | 1 | 1 | 1 | 1 | 1 | 1 | 1 |
| | 8 CSI-RS & 4 CRS (Examples #1) | 3 | 5 | 5 | 3 | 5 | 5 | 3 | 5 | 5 | 3 | 5 | 5 |
| | 8 CSI-RS & 4 CRS (Examples #2) | 3 | 4 | 5 | 3 | 4 | 4 | 3 | 4 | 5 | 3 | 4 | 5 |
| | 8 CSI-RS & 2 CRS (Examples #1) | 3 | 3 | 3 | 3 | 3 | 3 | 3 | 3 | 3 | 3 | 3 | 3 |
| | 8 CSI-RS & 2 CRS (Examples #2) | 3 | 3 | 3 | 3 | 3 | 3 | 3 | 3 | 3 | 3 | 3 | 3 |

Meanwhile, for configuration of an increased value (or a reduced value) of an offset value or a cyclic shifting offset value for each OFDM symbol in a predetermined PRB pair, offset configuration for a specific value may exceptionally allow only REs included specific E-REG indexes at an edge of a PRB pair, thereby causing inequality in channel estimation performance based on an RS (i.e., a DM-RS) for corresponding E-REG indexes.

Figure 40A:
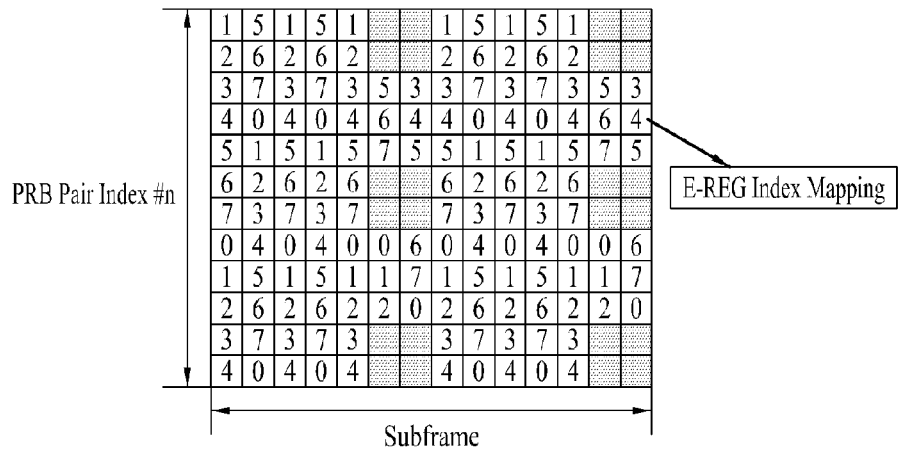
FIG. 40A illustrates a case in which an increased value of cyclic shifting offset for each OFDM symbol is assumed to 0 according to the fifth embodiment of the present invention.

FIG. 40A illustrates a case in which an increased value of cyclic shifting offset for each OFDM symbol is assumed to 0 according to the fifth embodiment of the present invention. In addition, FIG. 40B illustrates a case in which an increased value of cyclic shifting offset for each OFDM symbol is assumed to 4 according to the fifth embodiment of the present invention.

Figure 40B:
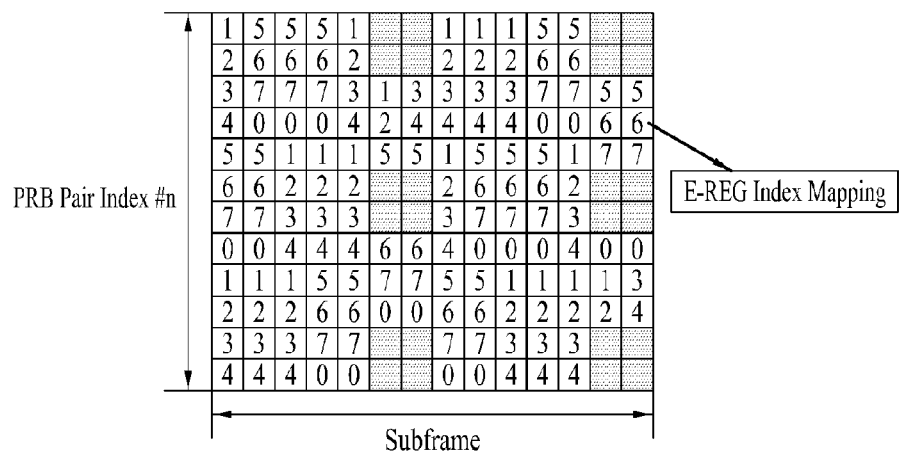
FIG. 40B illustrates a case in which an increased value of cyclic shifting offset for each OFDM symbol is assumed to 4 according to the fifth embodiment of the present invention.

In particular, FIGS. 40A and 40B assume that one PRB pair includes 8 E-REGs in a situation in which corresponding 24 REs used for 8 antenna port DM-RS transmission are excluded from a RE indexing scope (or an RE scope for counting (applying) cyclic shifting offset values for each OFDM symbol) for E-REG configuration.

As seen from FIGS. 40A and 40B, REs included in E-REG indexes #0, #1, #4, and #5 are mainly located at edges of a PRB pair and a problem arises in terms of degraded channel estimation performance based on a DM-RS. In order to overcome this problem, 0 or 4 may be excluded from candidates of an increased value of cyclic shifting offset according to change in OFDM symbol index.

Furthermore, an increased value (or a reduced value) of offset or a cyclic shifting offset value applied in an OFDM symbol in which a specific RS is transmitted, and an increased value (or a reduced value) of offset or a cyclic shifting offset value in an OFDM symbol in which a corresponding specific RS is not transmitted may be differently configured. For example, increased values (or reduced values) of offset or cyclic shifting offset values between an OFDM symbol in which a DM-RS (or a CRS) is transmitted and an OFDM symbol in which a DM-RS (or a CRS) is not transmitted may be independently configured.

<Sixth Embodiment>

Meanwhile, the number of available REs for E-PDCCH transmission on one PRB pair is insufficient in a specific subframe type environment, and thus a sixth embodiment of the present invention proposes configuration of 8 E-REGs for one E-CCE. Here, examples of the specific subframe type may include a special subframe of special subframe configurations #1, #2, #6, #7, and #9 as a normal CP, a normal subframe as an extended CP, etc., and include a special subframe of special subframe configurations #1, #2, #3, #5, and #6 as an extended CP.

In the above listed subframe type environment, since the number of available REs for E-PDCCH transmission on one PRB pair is insufficient, a rule in which one E-CCE includes 8 E-REGs may be applied in consideration of the small number of REs included in one E-REG. Accordingly, a relatively constant coding rate can be maintained in terms of an E-CCE irrespective of a phenomenon in which the number of available REs for E-PDCCH transmission is changed according to change in subframe type.

FIG. 41 illustrates an example of RE indexing of an E-REG in one PRB pair for explanation of the sixth embodiment of the present invention. In particular, FIG. 41 illustrates a case in which a subframe type is a normal subframe as an extended CP, FIG. 41(*a*) assumes a case in which one OFDM symbol is used for a legacy PDCCH, and FIG. 41(*b*) assumes a case in which one 8 antenna port CSI-RS is configured.

In addition, FIG. 41 assumes that overhead of a DM-RS is 16 RE and an E-REG index mapping rule for each RE is configured using a frequency priority mapping method. However, an E-REG index mapping operation is exceptionally omitted in REs configured for DM-RS transmission. That is, it is assumed that corresponding REs are not used for E-PDCCH transmission. In addition, it is assumed that 16 E-REGs (i.e., E-REG #0 to E-REG #15) are present on one PRB pair and a method of configuring cyclic shifting offset for each OFDM symbol is not applied in terms of E-REG index mapping for each RE.

FIG. 42 illustrates another example of RE indexing of an E-REG in one PRB pair for explanation of the sixth embodiment of the present invention. In particular, FIG. 42 illustrates a case in which a subframe type is an extended CP, FIG. 42(a) assumes a case in which one OFDM symbol is used for a legacy PDCCH, and FIG. 42(b) assumes a case in which one 8 antenna port CSI-RS is configured. In addition, FIG. 42 assumes the same case as in FIG. 41 for assumption for overhead of a DM-RS, an E-REG index mapping rule for each RE, and configuration for the number of E-REGs present on one PRB pair.

FIG. 42 is different from FIG. 41 in that it is assumed that a cyclic shifting offset configuring method for each OFDM symbol is applied in terms of E-REG index mapping and an increased value of corresponding offset is configured as 1. That is, the actually applied cyclic shifting offset on one a specific OFDM symbol can be extracted using a method of '(OFDM symbol index) modular (the total number of subcarriers present one PRB pair)'.

Table 8 below shows results of the number of REs included in each E-CCE when a rule in which one E-CCE includes 8 E-REGs like in the sixth embodiment of the present invention is applied in the aforementioned environment of FIGS. 41 and 42. Here, it is assumed that 2 E-CCEs (i.e., E-CCE #0 and ECE #1) are present on one PRB pair and that the E-CCEs include {E-REG #0, #2, #4, #6, #8, #10, #12, and #14} (i.e., E-CCE #0), and {E-REG #1, #3, #5, #7, #9, #11, #13, and #15} (i.e., E-CCE #1), respectively.

As seen from Table 8 below, in an environment in which a subframe type is an extended CP, a cyclic shifting offset configuring method for each OFDM symbol can reduce a number difference between REs included in respective E-CCEs.

TABLE 8

| {E-REG #0, #2, #4, #6, #8, #10, #12, #14} {E-REG #1, #3, #5, #7, #9, #11, #13, #15} | | The number of REs included in each E-CCE | | Number difference between REs included in respective E-CCEs |
|---|---|---|---|---|
| When cyclic shifting offset configuring method is not applied | Case of FIG. 41(a) | E-CCE#0 | 58 | 0 |
| | | E-CCE#1 | 58 | |
| | Case of FIG. 41 (b) | E-CCE#0 | 56 | 8 |
| | | E-CCE#1 | 64 | |
| When cyclic shifting offset configuring method is applied | Case of FIG. 42 (a) | E-CCE#0 | 58 | 0 |
| | | E-CCE#1 | 58 | |
| | Case of FIG. 42 (b) | E-CCE#0 | 60 | 0 |
| | | E-CCE#1 | 60 | |

Accordingly, as proposed according to the sixth embodiment of the present invention, when a rule in which one E-CCE includes 8 E-REGs is applied in an extended CP environment, 2 E-CCEs (i.e., E-CCE #0 and ECE #1) present on one PRB pair may include {E-REG #0, #1, #2, #3, #4, #5, #6, and #7} (i.e., E-CCE #0) and {E-REG #8, #9, #10, #11, #12, #13, #14, and #15} (i.e., E-CCE #1), respectively.

This method may be restrictively applied to only an extended CP environment. Alternatively, there are a subframe of special subframe configurations #1, #2, #6, #7, and #9 as a normal CP, a normal subframe as an extended CP, etc. In addition, a rule may be defined to apply the method to only a special subframe of special subframe configurations #1, #2, #3, #5, and #6 as an extended CP.

Table 9 below shows results of the number of REs included in each E-CCE when the proposed method is applied in the aforementioned environment of FIGS. 41 and 42. Here, it is assumed that 2 E-CCEs (i.e., E-CCE #0 and ECE #1) are present on one PRB pair and that the E-CCEs include {E-REG #0, #1, #2, #3, #4, #5, #6, and #7} (i.e., E-CCE #0), and {E-REG #8, #9, #10, #11, #12, #13, #14, and #15} (i.e., E-CCE #1), respectively according to the proposed method. As seen from Table 9 below, when the proposed method is applied in a normal subframe environment as an extended CP, a maximum difference between the numbers of REs included in respective E-CCEs can be reduced.

TABLE 9

| {E-REG #0, #1, #2, #3, #4, #5, #6, #7} {E-REG #8, #9, #10, #11, #12, #13, #14, #15} | | The number of REs included in each E-CCE | | Number difference between REs included in respective E-CCEs |
|---|---|---|---|---|
| When cyclic shifting offset configuring method is not applied | Case of FIG. 41 (a) | E-CCE#0 | 56 | 4 |
| | | E-CCE#1 | 60 | |
| | Case of FIG. 41 (b) | E-CCE#0 | 60 | 0 |
| | | E-CCE#1 | 60 | |
| When cyclic shifting offset configuring method is applied | Case of FIG. 42 (a) | E-CCE#0 | 56 | 4 |
| | | E-CCE#1 | 60 | |
| | Case of FIG. 42 (b) | E-CCE#0 | 60 | 0 |
| | | E-CCE#1 | 60 | |

In detail, as seen from Tables 8 and 9 above, a maximum difference between the numbers of REs included in respective E-CCEs is 8 RE in Table 8, and a maximum difference between the numbers of REs included in respective E-CCEs is reduced to 4 RE in Table 9. In addition, it can be seen that a difference between the numbers of REs included in respective E-CCEs due to CSI-RS configuration can be reduced. That is, a maximum difference between the numbers of REs included in respective E-CCEs is 8 RE in the case of FIG. 41(b) in Table 8, and a maximum difference between the numbers of REs included in respective E-CCEs is reduced to 0 in the case of FIG. 41(b) in Table 9.

Meanwhile, an E-CCE as a basic unit used for E-PDCCH transmission includes 8 E-REGs according to a subframe type (or special subframe configuration or CP configuration) of a PRB pair including an corresponding E-CCE, which corresponds to the case in which one PRB pair includes 2 E-CCEs for localized transmission (and/or distributed transmission) of E-PDCCH. Here, examples of the subframe type in which an E-CCE includes 8 E-REGs may include a normal subframe as an extended CP, a special subframe of special subframe configurations #1, #2, #6, #7, and #9 as a normal CP, a special subframe of special subframe configurations #1, #2, #3, #5, and #6 as an extended CP, etc. However, it is also possible that an E-CCE includes 4 E-REGs. This case corresponds to the case in which one PRB includes 4 E-CCEs for localized transmission (and/or distributed transmission) of E-PDCCH. Examples of the subframe type in which an E-CCE includes 4 E-REGs may include a normal subframe as a normal CP, a special subframe of special subframe configurations #3, #4, and #8 as a normal CP, etc. For example, the operation may be performed to maintain the number of REs included in one E-CCE to a similar level irrespective of a subframe type (or special subframe configuration or CP configuration), thereby maintaining a relatively constant coding rate in terms of an E-CCE.

However, CRS transmission is performed at a predetermined period but not every subframe in the aforementioned NCT, and thus, PDCCH transmission may not be ensured at each subframe point of time or a PDCCH may not be embodied in a corresponding NCT. Accordingly, when E-PDCCH start symbol position configuration, E-PDCCH configuration resource configuration, or subframe type configuration (or special subframe configuration or CP configuration is applied like in a legacy carrier type (LCT), it may be possible to use more REs for E-PDCCH transmission than an LCT in the case of NCT.

Accordingly, in the sixth embodiment of the present invention, when NCT-based E-PDCCH transmission is performed, a rule may be defined in such a way that the number of E-REGs included in one E-CCE is differently configured from the case of LCT. In detail, this case corresponds to the case in which an E-CCE includes 4 E-REGs and one PRB pair includes 4 E-CCEs for localized transmission (and/or distributed transmission) of NCT-based E-PDCCH. Examples of a subframe type in which an E-CCE includes 4 E-REGs may be a normal subframe as a normal CP or an extended CP, a special subframe of special subframe configurations #1, #2, #3, #4, #6, #7, #8, and #9 as a normal CP, etc. In addition, the examples may include a special subframe of special subframe configurations #1, #2, #3, #5, and #6 as an extended CP, etc. Here, an excluded special subframe configuration may be a special subframe in which E-PDCCH transmission is not preferable due to the insufficient number of REs, etc. However, a minimum aggregation level for blind decoding may be 1 or 2.

Needless to say, this can also be extensively applied to LCT to which a carrier aggregation scheme is applied together with NCT as well as to NCT. In addition, this can be exceptionally applied for an E-PDCCH transmitted in the corresponding LCT only when a cross carrier scheduling (CSS) scheme from an LCT is applied for uplink/downlink data transmission on an NCT.

In addition, the sixth embodiment of the present invention can be limited only to the case in which a start symbol location of an E-PDCCH is determined as a predefined specific OFDM symbol location on an NCT. Here, for applying the sixth embodiment of the present invention, a start symbol location of an E-PDCCH on NCT may be defined as a first OFDM symbol or a third OFDM symbol on a subframe.

In the sixth embodiment of the present invention, a rule may be defined to be applied only in a subframe in which a predefined specific RS such as a CRS, a tracking RS, or a CSI-RS is not transmitted on NCT or a frequency resource region (e.g., a PRB pair) location in which predefined specific signaling/specific channel such as PSS/SSS/PBCH is not transmitted.

The aforementioned embodiment can be extensively applied to the case in which an E-CCE used for transmission of a single E-PDCCH, that is, USS (or E-PHICH or E-PCFICH) or CSS of E-PDCCH is extracted from preconfigured different PRB pair regions for frequency distributed transmission as well as to the case in which the E-CCE used for transmission of a single E-PDCCH is extracted from a single PRB pair region (or predefined consecutive PRB pair regions). In addition, the proposed method according to the present invention can be extensively applied to all E-REG configurations required for embodying USS or CSS of an E-PDCCH.

In addition, the aforementioned proposed methods can also be extensively applied in a multicast broadcast single frequency network (MBSFN) in which control information is transmitted through first one or two OFDM symbols. In addition, the aforementioned proposed methods can also be applied to the case in which an E-REG used for E-PDCCH transmission is configured using REs in the remaining region obtained by excluding corresponding OFDM symbols when the number of OFDM symbols used for legacy PDCCH transmission is configured as 1, 2, or 3 or more or OFDM symbols used for the corresponding legacy PDCCH transmission are punctured.

In addition, in the case of TDD system, the proposed methods can also be extensively applied to the case in which a region in which an E-REG used for E-PDCCH transmission can be configured in a rear OFDM symbol in one subframe unlike in the case in which the number of OFDM symbols allocated to DwPTS of a special subframe is changed, that is, the case in which an OFDM symbol used for legacy PDCCH transmission is configured in a first OFDM symbol. The proposed methods can also be extensively applied to the case in which an extended CP or a normal CP is applied.

Meanwhile, the number of E-REGs included in an E-PDCCH (or a PRB pair) may be changed based on whether a PDCCH is transmitted in a predetermined time region resource (e.g., 1 subframe), whether a PDCCH is transmitted or whether a special subframe is configured, or a DwPTS configuring state (e.g., configuration of the number of OFDM symbols used for legacy PDCCH or configuration of the number of OFDM symbols used as DwPTS) according to a predetermined rule. According to this method, even if the number of REs that can be used for E-REG configuration of E-PDCCH (or PRB pair) is changed in a predetermined time region resource (e.g., 1 subframe), the number of E-REGs included in the E-PDCCH (or PRB pair) can be effectively configured. Here, information about the number of E-REGs included in the E-PDCCH (or PRB pair) may be signaled to a UE from an eNB via a higher layer signal or a physical layer signal. Alternatively, the number of E-REGs included in E-PDCCH (or PRB pair) may be implicitly changed based on the number of REs that can be included in an E-REG of E-PDCCH (or PRB pair), that is, the number of REs obtained by excluding OFDM symbols or REs used for RS or PDCCH transmission. The proposed methods can also be extensively applied to the case in which one or a plurality of E-PDCCHs-based component carrier (or cell) are used or all cases in which E-PDCCH-based component carrier (or cell) and (legacy) PDCCH-based component carrier (or cell) are used together in an environment in which a carrier aggregation scheme is applied. In addition, the proposed methods can also be extensively applied to the case in which an extension carrier (or NCT) is embodied using an E-PDCCH-based operation in an environment in which a carrier aggregation scheme is applied. Moreover, the proposed methods can also be extensively applied to all cases in which legacy PDCCH is not transmitted and all cases in which legacy PDCCH is transmitted.

Figure 43:
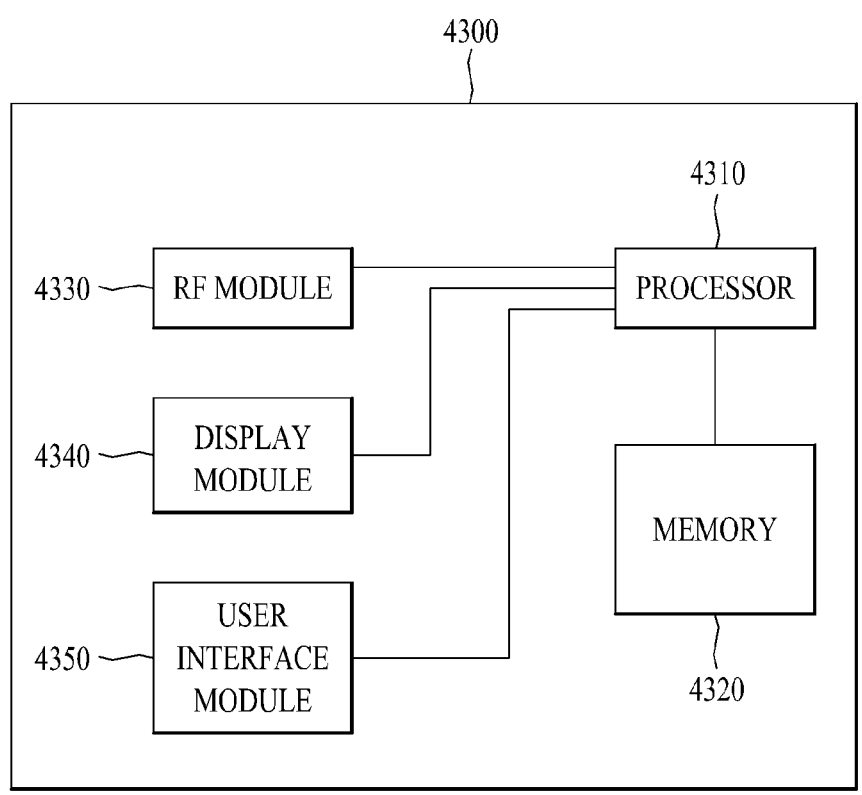
FIG. 43 is a block diagram of a structure of a communication device according to an embodiment of the present invention.

FIG. 43 is a block diagram of a structure of a communication device 4300 according to an embodiment of the present invention.

Referring to FIG. 43, the communication device 4300 includes a processor 4310, a memory 4320, an RF module 4330, a display module 4340, and a user interface module 4350.

The communication device 4300 is illustrated for convenience of description and some modules may not be omitted. The communication device 4300 may further include necessary modules. In addition, some modules of the communication device 4300 may be subdivided. The processor 4310 is configured to perform operations according to the embodiment of the present invention that is exemplified with reference to the diagrams. In detail, a detailed operation of the processor 4310 would be understood with reference to FIGS. 1 to 42.

The memory 4320 is connected to the processor 4310 and stores an operating system, an application, a program code, data, etc. The RF module 4330 is connected to the processor 4310 and converts a baseband signal into a radio signal or converts a radio signal into a baseband signal. To this end, the RF module 4330 performs analog conversion, amplification, filtering, and frequency up-conversion, or inverse procedures thereof. The display module 4340 is connected to the processor 4310 and displays various pieces of information. The display module 4340 may use, but is not limited to, well-known elements such as a liquid crystal display (LCD), a light emitting diode (LED), and an organic light emitting diode (OLED). The user interface module 4350 may be connected to the processor 4310 and may include a combination of well-known user interfaces such as keypads, touchscreens, etc.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

The embodiments of the present invention may be achieved by various means, for example, hardware, firmware, software, or a combination thereof. In a hardware configuration, the methods according to exemplary embodiments of the present invention may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

Although the aforementioned method and apparatus for allocating a resource for a downlink control channel in a wireless communication system has been described in terms of an example applied to a $3^{rd}$ generation partnership project (3GPP) long term evolution (LTE) system, the method and apparatus can be applied to various wireless communication systems as well as to the 3GPP LTE system.

The invention claimed is:

1. A method for allocating a resource for a downlink control channel by a base station (BS) in a wireless communication system, the method comprising:
    mapping resource elements for a channel state information reference signal (CSI-RS) transmission in each resource block for the downlink control channel into a first predetermined number of resource element groups equally;
    mapping remaining resource elements other than the resource elements for the CSI-RS transmission into the first predetermined number of resource element groups by dividing the remaining resource elements in each resource block for the downlink control channel along a frequency domain;
    configuring each control channel element using a second predetermined number of resource element groups among the first predetermined number of resource element groups;
    allocating the control channel elements as the resource for the downlink control channel, wherein the number of control channel elements equals an aggregation level of the downlink control channel, and
    transmitting the downlink control channel using the allocated resource,
    wherein the number of available resource elements included in each resource element group is equivalent.

2. The method according to claim 1, wherein the number of resource elements in each resource element group, to which one or more reference signals, including the CSI-RS are allocated, is changed according to a type of subframe in which the downlink control channel is transmitted, and
    wherein the number of resource elements to which the one or more reference signals, including the CSI-RS, are allocated in each resource element group is equivalent.

3. The method according to claim 1, wherein the number of resource elements in each resource element group, to which one or more reference signals including the CSI-RS are allocated, is changed based on the configuration of the one or more reference signals configured for each of the resource blocks, and
    wherein the number of resource elements to which the one or more reference signals, including the CSI-RS, are allocated in each resource element group is equivalent.

4. The method according to claim 1, wherein each of the control channel elements, of which the number is the same as the aggregation level, is included in a different resource block.

5. The method according to claim 1, wherein the second predetermined number is determined according to a type of a subframe in which the downlink control channel is transmitted.

6. The method according to claim 1, further comprising puncturing a resource element, to which one or more reference signals, including the CSI-RS, are allocated for the downlink control channel.

7. The method according to claim 1, further comprising rate-matching the downlink control channel so as to correspond to resources for the downlink control channel, obtained by excluding a resource element for one or more reference signals including the CSI-RS.

8. The method according to claim 1, wherein the first predetermined number is 4.

9. The method according to claim 1, wherein 16 resource elements are allocated for a user equipment specific reference signal, wherein the 16 resource elements are allocated in symbols #5, #6, #12, #13 among symbols #0 to #13 of each resource block for the downlink control channel, in subcarriers #0, #5, #6, #11 among subcarriers #0 to #11 of each resource block for the downlink control channel.

10. The method according to claim 1, wherein the available resource elements are resource elements to which one or more reference signals including the CSI-RS are not allocated and resource elements not used for legacy physical downlink control channel transmission.

11. The method according to claim 1, wherein each resource block for the downlink control channel is a pre-configured search space of the downlink control channel.

* * * * *